(12) United States Patent
Kawaura et al.

(10) Patent No.: US 6,445,459 B1
(45) Date of Patent: Sep. 3, 2002

(54) IMAGE COMMUNICATION SYSTEM

(75) Inventors: Takeo Kawaura; Ryuta Suzuki, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/181,002

(22) Filed: Oct. 28, 1998

(30) Foreign Application Priority Data

Oct. 30, 1997 (JP) .............................................. 9-298414

(51) Int. Cl.$^7$ .............................................. G06F 12/00
(52) U.S. Cl. ...................... 358/1.15; 358/439; 358/404; 358/435; 345/1.2
(58) Field of Search ................................ 358/434, 439, 358/404, 435, 1.15, 1.16, 1.17; 345/1.2, 966, 823

(56) References Cited

U.S. PATENT DOCUMENTS

| | | | | |
|---|---|---|---|---|
| 5,172,246 A | * | 12/1992 | Yoshida | 358/406 |
| 5,196,947 A | * | 3/1993 | Takahashi | 358/441 |
| 5,202,915 A | * | 4/1993 | Nishii | 379/100 |
| 5,459,581 A | * | 10/1995 | Ohyanagi | 358/296 |
| 5,577,107 A | * | 11/1996 | Inagaki | 379/96 |
| 5,640,195 A | * | 6/1997 | Chida | 348/13 |
| 5,721,731 A | * | 2/1998 | Yoshida | 370/296 |
| 5,751,445 A | * | 5/1998 | Masunaga | 358/426 |
| 5,751,722 A | * | 5/1998 | Maekawa | 370/522 |
| 5,963,245 A | * | 10/1999 | McDonald | 348/8 |

FOREIGN PATENT DOCUMENTS

JP 7333522 * 12/1995 ........... G02B/21/36

* cited by examiner

*Primary Examiner*—Edward Coles
*Assistant Examiner*—Tia A Carter
(74) *Attorney, Agent, or Firm*—Birch, Stewart, Kolasch & Birch, LLP

(57) ABSTRACT

In an communication system comprising a transmitter unit for digitally converting an input image signal and for outputting the converted image signal, and a receiver unit for entering thereinto the image signal derived from the transmitter unit and for displaying this entered image signal, the receiver unit outputs to the transmitter unit, an end signal for indicating that a display process of the image signal entered from the transmitter unit is accomplished.

12 Claims, 26 Drawing Sheets

IMAGE COMMUNICATION SYSTEM

BACKGROUND OF THE INVENTION

1. Field of the Invention

The present invention is related to an image communication system for communicating image data.

2. Description of the Related Art

As prior art, Japanese Unexamined Patent Application No. 7-333522 opened in 1995 discloses the image transfer/display apparatus. The conventional image transfer/display apparatus shown in Japanese Unexamined Patent Application No. 7-333522 is arranged by, as indicated in FIG. 26, an image input apparatus 2 for imaging a photographing subject and for digitally converting image data of the photographing subject into the digital image data and further for outputting the digital image data. In the case that the image data digitalized by the image input apparatus 2 is outputted to the broad band network 5, the image transfer/display apparatus transmits the image data outputted from the image input apparatus 2 to another image transfer/display apparatus as the transmission destination. The image transfer/display apparatus contains the communication control means 6 for transmitting/receiving the image data. The image transfer/display apparatus as the transmission destination owns the storage means 20 for receiving the image data transmitted from the transmission source via the communication control means 6 to store thereinto the received image data, and the control terminal 3 for entering predetermined image data which is desirably selected by the user from the image data stored. in the storage means 20. This image transfer/display apparatus further includes the image selecting means 19 for selecting the predetermined image data entered through the control terminal from the storage means 20, and the display apparatus 1 for displaying the image data selected by the image selecting means 19.

The conventional image transfer/display apparatus owns the following problems. That is, the image transfer/display apparatus cannot confirm that the image data is transferred under normal condition to the image transfer/display apparatus of the transmission source, and the image data is displayed under normal condition.

SUMMARY OF THE INVENTION

The present invention is to provide an image communication system by which a user of a transmitter unit can confirm as to whether or not image data transmitted from the transmission unit can be firmly transferred to a receiver unit and can be surely displayed in the receiver unit.

An image communication system, according to a first aspect of the present invention, is featured by comprising: a transmitter unit for digitally converting an input image signal and for outputting the converted image signal; and a receiver unit for entering thereinto the image signal derived from the transmitter unit and for displaying this entered image signal; wherein: the receiver unit outputs to the transmitter unit, an end signal for indicating that a display process of the image signal entered from the transmitter unit is accomplished.

An image communication system, according to a second aspect of the present invention, is featured in that the transmitter unit is comprised of display means for displaying the entry of the end signal upon input of the end signal supplied from the receiving unit.

An image communication system, according to a third aspect of the present invention, is featured in that the transmitter unit is comprised of communication history managing means for updating a communication history upon input of the end signal supplied from the receiver unit.

An image communication system, according to a fourth aspect of the present invention, is featured in that the transmitter unit is comprised of communication history display means for displaying the updated communication history.

An image communication system, according to a fifth aspect of the present invention, is featured in that the transmitter unit is comprised of a liquid crystal display device as the display means for displaying the entry of the end signal.

An image communication system, according to a sixth aspect of the present invention, is featured in that the transmitter unit is comprised of a speech producing apparatus for producing speech when the end signal supplied from the receiver unit is entered as the display means for displaying the entry of the end signal.

An image communication system, according to a seventh aspect of the present invention, is featured in that the transmission unit is comprised of: a liquid crystal display device as the display means for displaying the entry of the end signal; and a speech producing apparatus for producing speech when the end signal supplied from the receiver unit is entered.

An image communication system, according to an eighth aspect of the present invention, is featured in that the transmitter unit is comprised of: a liquid crystal display device as the communication history display means for displaying the updated communication history.

Now, a description will be given in more detail of preferred embodiments of the present invention with reference to the accompanying drawings.

DETAILED DESCRIPTION OF THE PREFERRED EMBODIMENTS

Now, a description will be given in more detail of preferred embodiments of the present invention with reference to the accompanying drawings.

(Embodiment 1)

Figure 1:
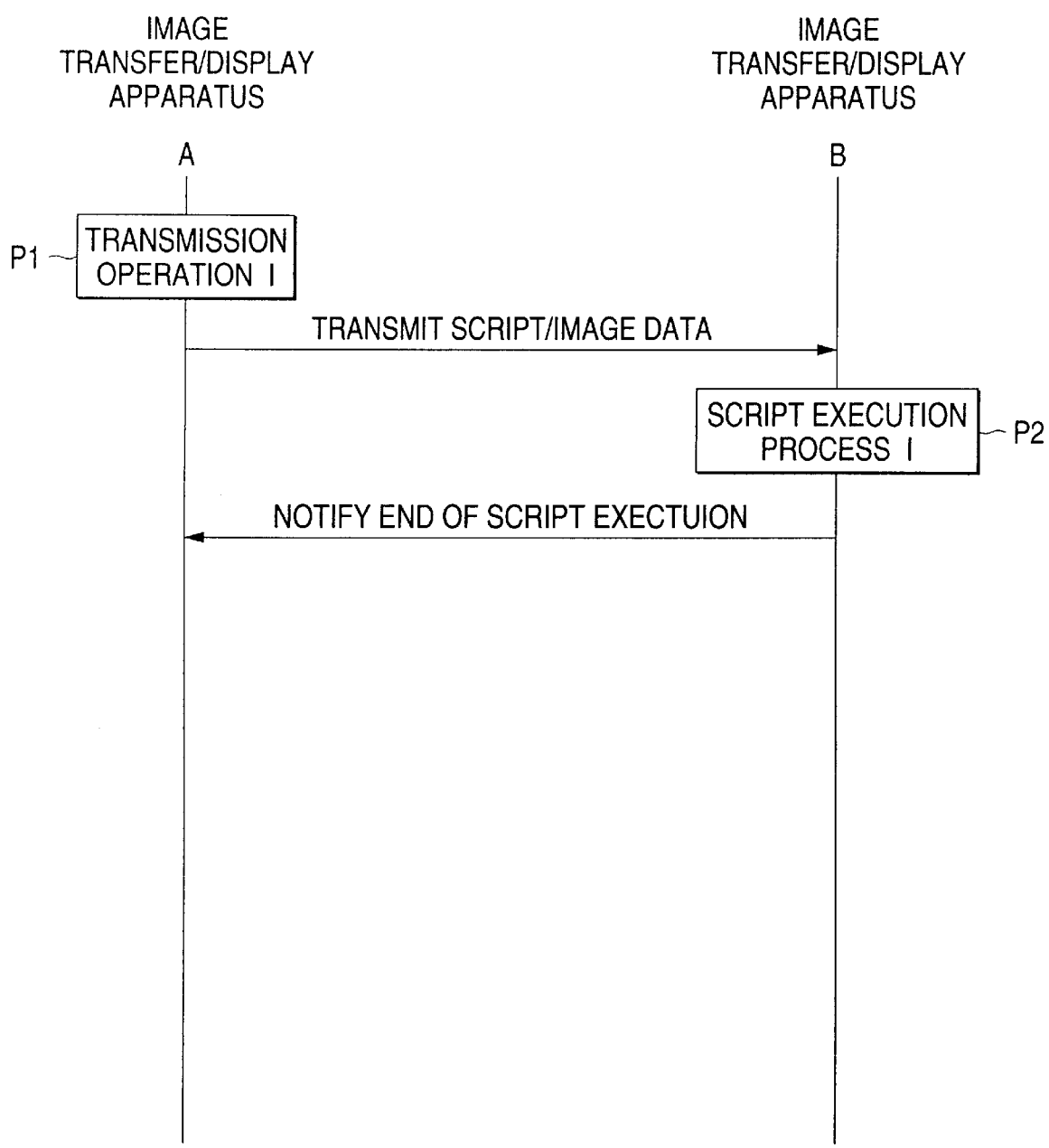
FIG. 1 shows a communication sequence according to an embodiment 1 of the present invention.

FIG. 1 represents an embodiment 1 of the present invention. Referring now to FIG. 1, a communication sequence of a communication system according to this embodiment 1 will be summarized. In this drawing, it is assumed that both image data and script corresponding to reproduction control information such as a reproducing order of the image data and a specific display effect are transmitted from an image transfer/display apparatus "A" functioning as a transmission source to another image transfer/display apparatus "B" functioning as a transmission destination so as to execute the script. For instance, when a user of the image transfer/display apparatus A of the transmission source executes a transmission operation IP1, this image transfer/display apparatus A of the transmission source transmits both image data and script to the image transfer/display apparatus B of the transmission destination. Next, upon receipt of the image data and the script, the image transfer/display apparatus B of the transmission destination executes a script execution process IP2, and transmits "notification of end of script execution" to the image transfer/display apparatus A of the transmission source.

Figure 2:
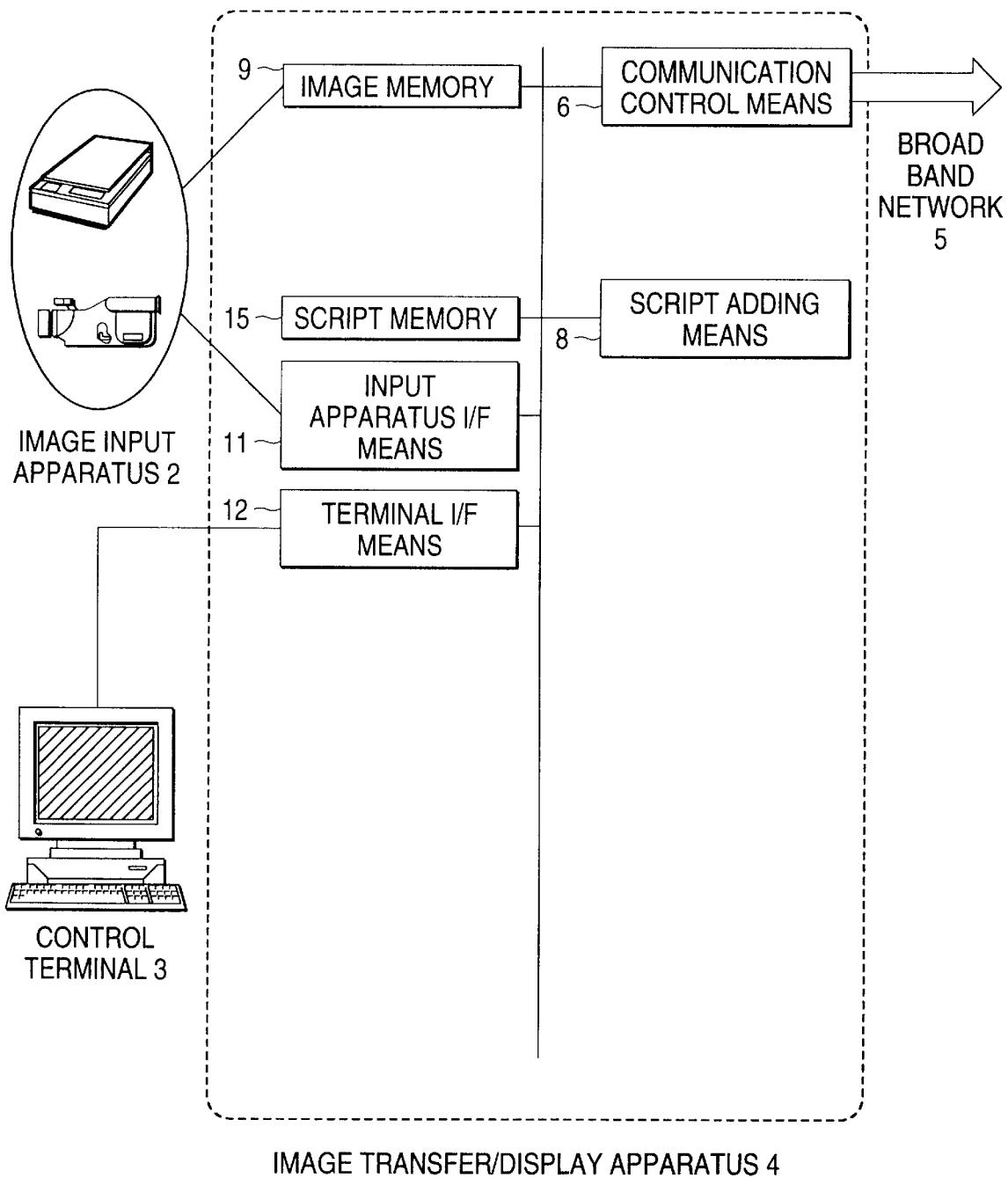
FIG. 2 represents an arrangement of an image transfer/display apparatus of a transmission source according to the embodiment 1.

A description will now be made of an arrangement of the image transfer/display apparatus A of the transmission source in the above-described communication system. FIG. 2 is a structural diagram of the image transfer/display apparatus A according to the embodiment 1 of the present invention. This image transfer/display apparatus A is arranged by an image input apparatus 2; an input apparatus I/F means 11 connected to the image input apparatus 2; a control terminal 3 for producing script corresponding to reproduction control information such as a reproducing order of image data and a specific display effect; and a terminal I/F means 12 connected to the control terminal 3. This image transfer/display apparatus A is also constituted by an image memory 9 for temporarily storing the image data produced by the image input apparatus 2; a script memory 15 connected to the terminal I/F means 12, for temporarily storing the script formed by the control terminal 3; a script adding means 8 for adding the script to the image data; and a communication control means 6 connected to a broad band network 5.

Figure 3:
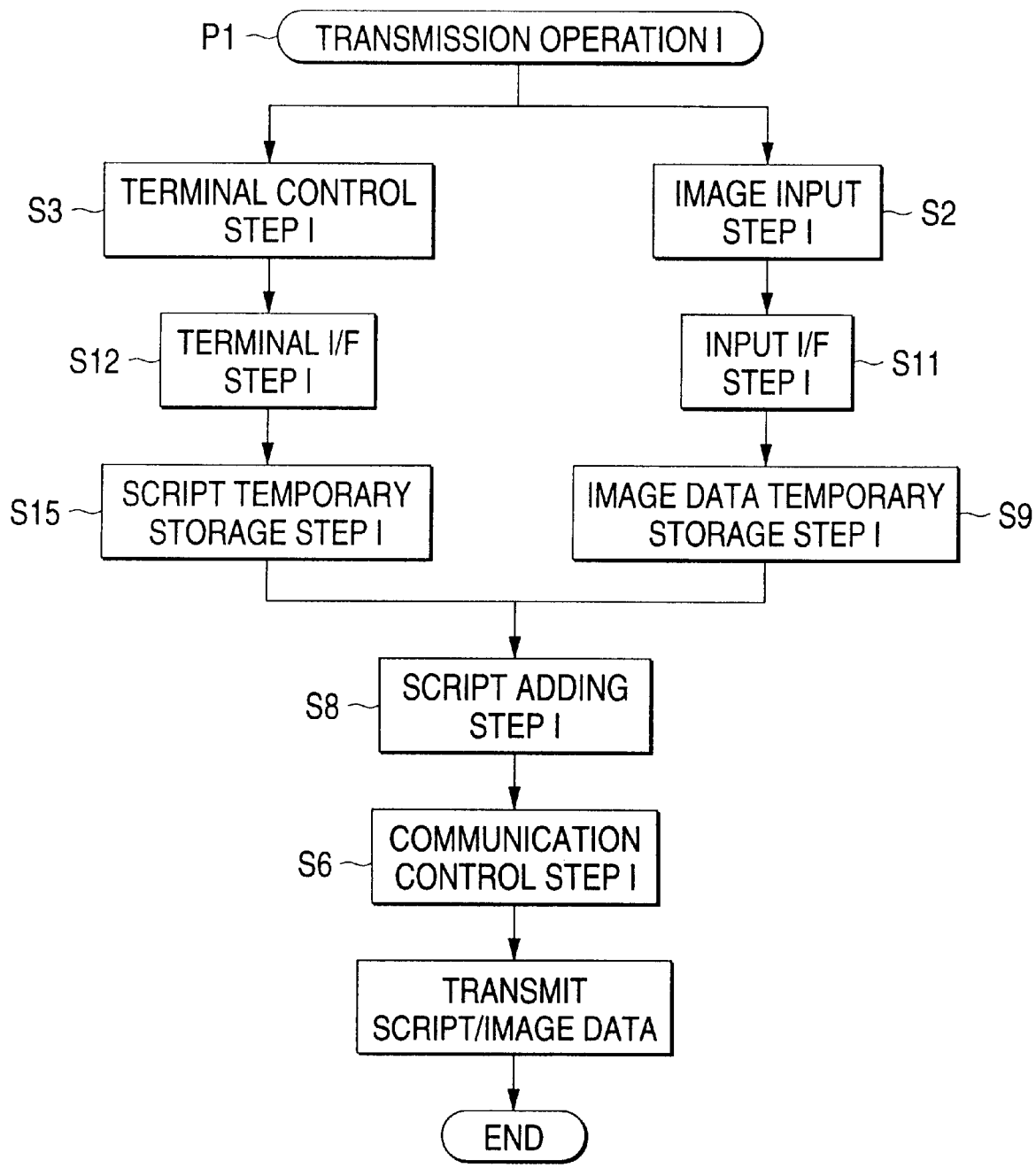
FIG. 3 is a flow chart for describing transmission operation according to the embodiment 1.

Next, as to operations of the image transfer/display apparatus A of the transmission source, the transmission operation IP1 shown in FIG. 1 will now be explained as an example. A user of this image transfer/display apparatus A temporarily stores the image data produced by the image input apparatus 2 via the input apparatus I/F means 11 into the image memory 9. The user of this apparatus temporarily stores the script formed by the control terminal 3 via the terminal I/F means 12 into the script memory 15. Then, the script temporarily stored in the script memory 15 is added to the image data temporarily stored in the image memory 9 by the script adding means 8. The image data added with the script is transmitted via the broad band network 5 to the image transfer/display apparatus 4 of the transmission source by the communication control means 6. It should be noted that this process sequence is indicated in a flow chart of FIG. 3.

Figure 4:
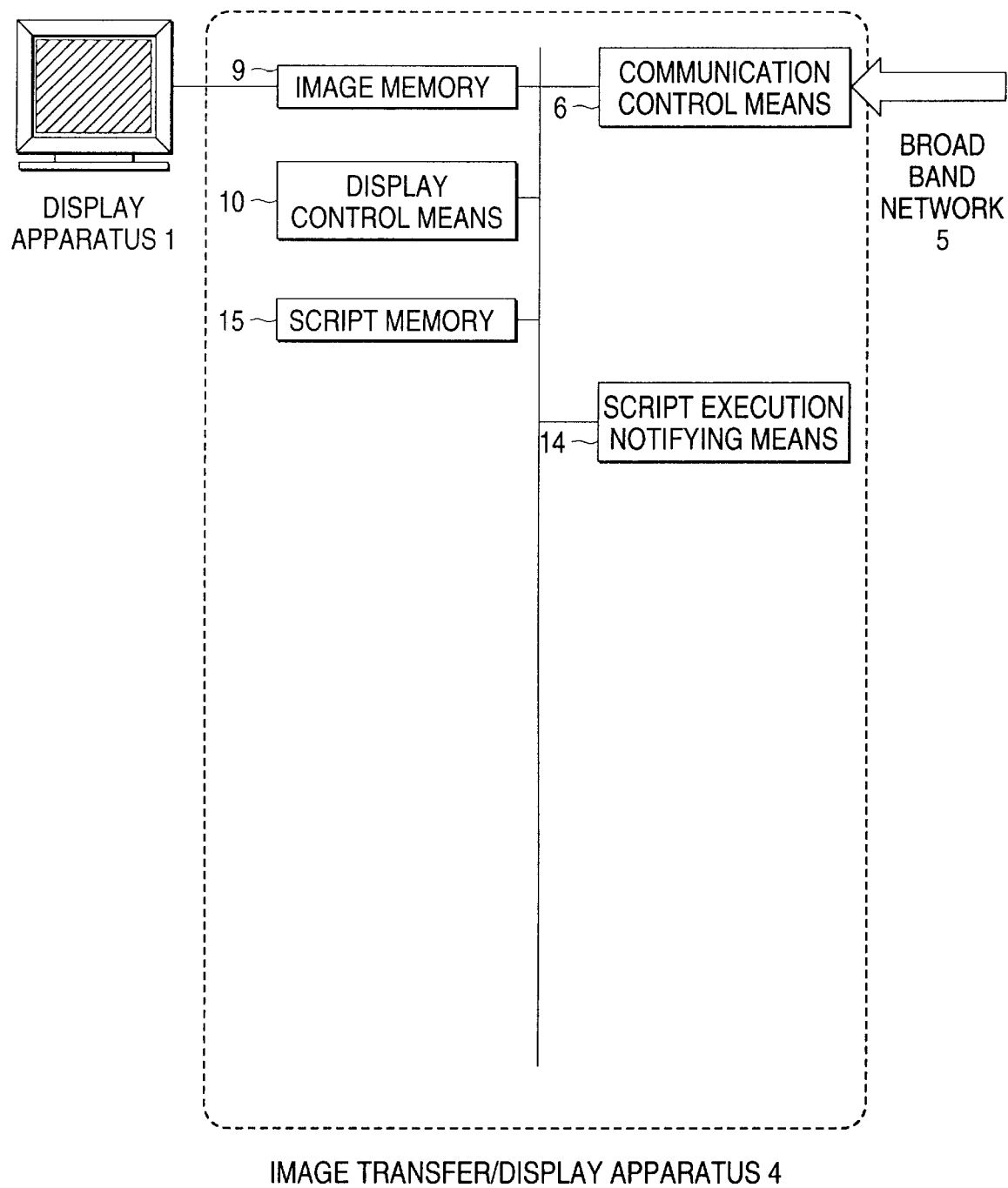
FIG. 4 indicates an arrangement of an image transfer/display apparatus of a transmission destination according to the embodiment 1.

A description will now be made of an arrangement and operations of the image transfer/display apparatus B of the transmission source in the image communication system of FIG. 1. FIG. 4 is a structural diagram for representing the arrangement of the image transfer/display apparatus B of the transmission destination. This image transfer/display apparatus B is arranged by an image memory 9 for temporarily storing thereinto image data; a script memory 15 for temporarily storing thereinto received script; and a display control means 10 for sequentially executing the script to display image data on the display apparatus 1. The image transfer/display apparatus B is further constituted by a script execution notifying means 14 connected to the image memory 9, the display control means 10, and the script memory 15, respectively, for forming "notification of end of script execution", and for transmitting "notification of end of script execution" via the broad band network 5 to the image transfer/display apparatus A of the transmission source; and a communication control means 6 connected to the broad band network 5.

Figure 5:
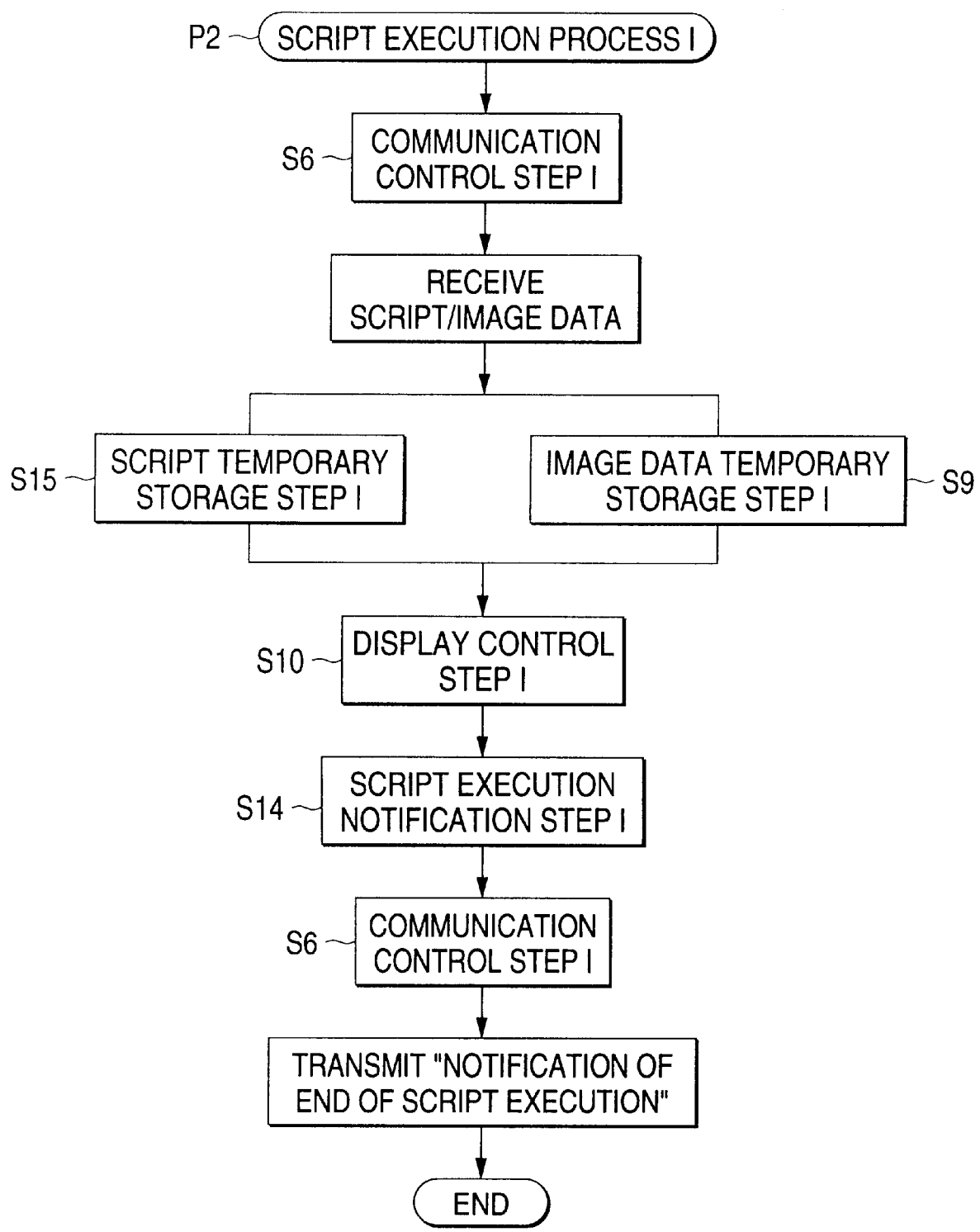
FIG. 5 is a flow chart for describing a script execution process operation according to the embodiment 1.

Next, as to operations of the image transfer/display apparatus B as the transmission destination, the script execution process IP2 in FIG. 1 will now be explained as an example. The communication control means 6 receives script from the image transfer/display apparatus A of the transmission source via the broad band network 5 in combination with image data. The communication control means 6 temporarily stores the image data into the image memory 9, and the script into the script memory 15. The display control means 10 reads the script from the script memory 15, and displays the image data of the image memory 9 on the display apparatus 1 in accordance with this read script. In the case that the display process of the image data is accomplished in the display apparatus 1, the script execution notifying means 14 forms "notification of end of script execution", and transmits "notification of end of script execution" via the broad band network 5 to the image transfer/display apparatus 4 of the transmission source. It should be understood that this process sequence is indicated in a flow chart of FIG. 5.

Since the above-described image transfer/display apparatuses A and B are employed and also the means for displaying "end of script" is provided, the user of the image transfer/display apparatus A of the transmission source can recognize that both the transmitted image data and the transmitted script are reached to the image transfer/display apparatus B of the transmission destination, and the display of the image data in accordance with the script is accomplished. As a consequence, in such a case that the image transfer/display apparatus B of the transmission source still executes the script, it is possible to prevent both the image data and the script from being transmitted. Also, it is possible to prevent both the image data and the script from being overwritten into the image memory and the script memory of the image transfer/display apparatus B of the transmission source, respectively.

(Embodiment 2)

Figure 6:
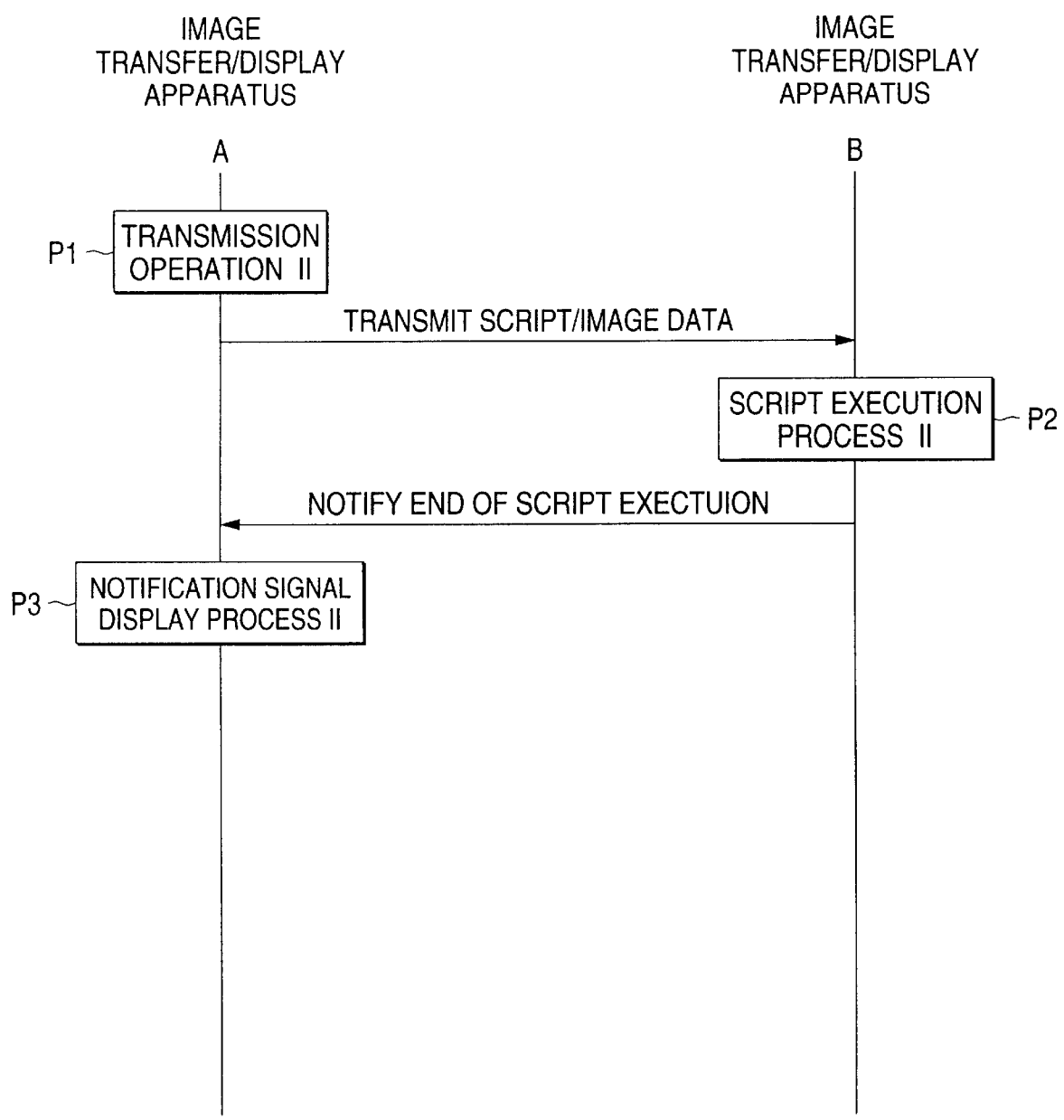
FIG. 6 shows a communication sequence according to an embodiment 2 of the present invention.

FIG. 6 represents an embodiment 2 of the present invention. Referring now to FIG. 6, a communication sequence of a communication system according to this embodiment 2 will be summarized. In this drawing, it is assumed that both image data and script are transmitted from an image transfer/display apparatus "A" functioning as a transmission source to another image transfer/display apparatus "B" functioning as a transmission destination so as to execute the script. For instance, when a user of the image transfer/display apparatus A of the transmission source executes a transmission operation IIp1, this image transfer/display apparatus A of the transmission source transmits both image data and script to the image transfer/display apparatus B of the transmission destination. Next, upon receipt of the image data and the script, the image transfer/display apparatus B of the transmission destination executes a script execution process IIP2, and transmits "notification of end of script execution" to the image transfer/display apparatus A of the transmission source. Next, upon receipt of "notification of end of script execution", the image transfer/display apparatus A of the transmission source executes a notification signal display process IIP3.

Figure 7:
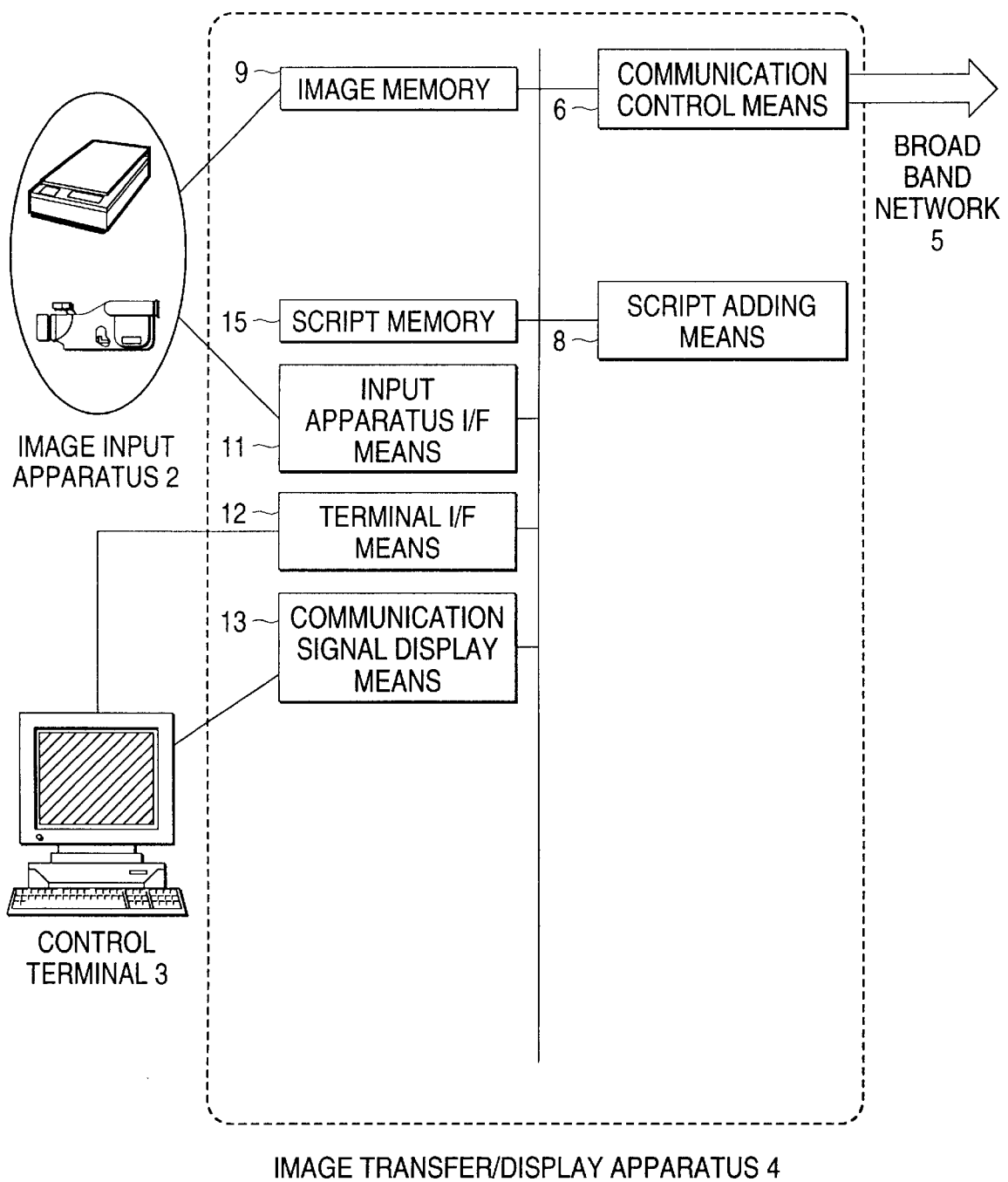
FIG. 7 represents an arrangement of an image transfer/display apparatus of a transmission source according to the embodiment 2.

A description will now be made of an arrangement of the image transfer/display apparatus A of the transmission source in the above-described image communication system. FIG. 7 is a structural diagram of the image transfer/display apparatus A according to the embodiment 2 of the present invention. This image transfer/display apparatus A is such an image transfer/display apparatus constituted by adding a notification signal display means 13 to the image transfer/display apparatus of the transmission source according to the embodiment 1 of FIG. 2. This notification signal display means 13 displays the end of the script execution on the control terminal when "notification of end of script execution" is received.

Figure 8:
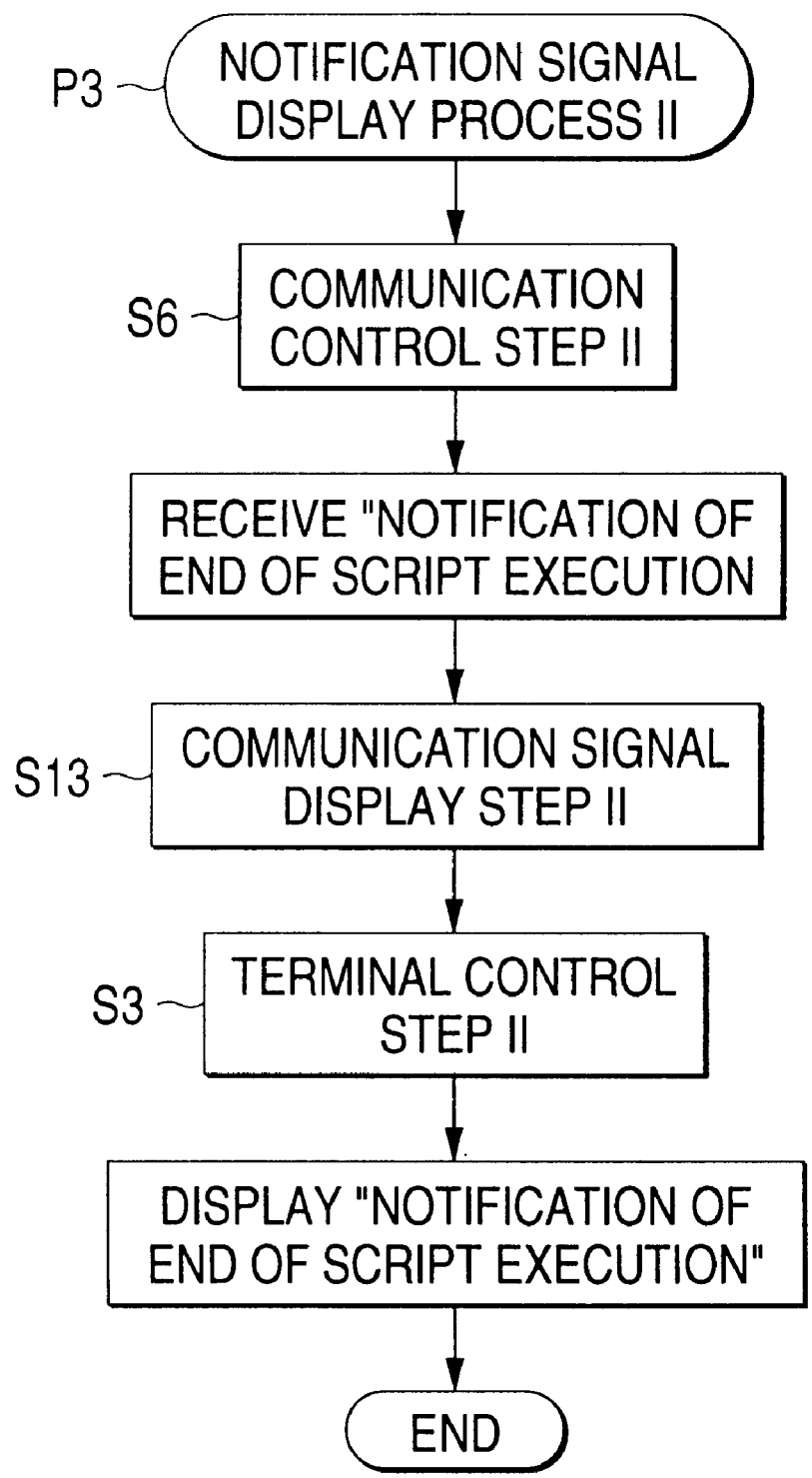
FIG. 8 is a flow chart for describing a notification signal display process operation according to the embodiment 2.

Next, as to operations of the image transfer/display apparatus A of the transmission source, a description will now be made of the notification signal display process IIP3 in FIG. 6. The communication control means 6 receives "notification of end of script execution" via the broad band network 5 from the image transfer/display apparatus B of the transmission destination. When the above-described image transfer/display apparatus A of the transmission source receives "notification of end of script execution", the notification signal display means 13 displays "end of script execution" on the control terminal 3. As a result, the user can visually confirm the completion of the display in the image transfer/display apparatus B of the transmission destination. This process sequence is described in a flow chart of FIG. 8. It should be noted that the process operations executed in IIP1 and IIP2 are identical to those as explained in the embodiment 1.

Since the above-described image transfer/display apparatuses A and B are employed, the user of the image transfer/display apparatus A of the transmission source can recognize that both the transmitted image data and the transmitted script are reached to the image transfer/display apparatus B of the transmission destination, and the display of the image data in accordance with the script is accomplished. As a consequence, in such a case that the image transfer/display apparatus B of the transmission source still executes the script, it is possible to prevent both the image data and the script from being transmitted. Also, it is possible to prevent both the image data and the script from being overwritten into the image memory and the script memory of the image transfer/display apparatus B of the transmission source, respectively.

(Embodiment 3)

Figure 9:
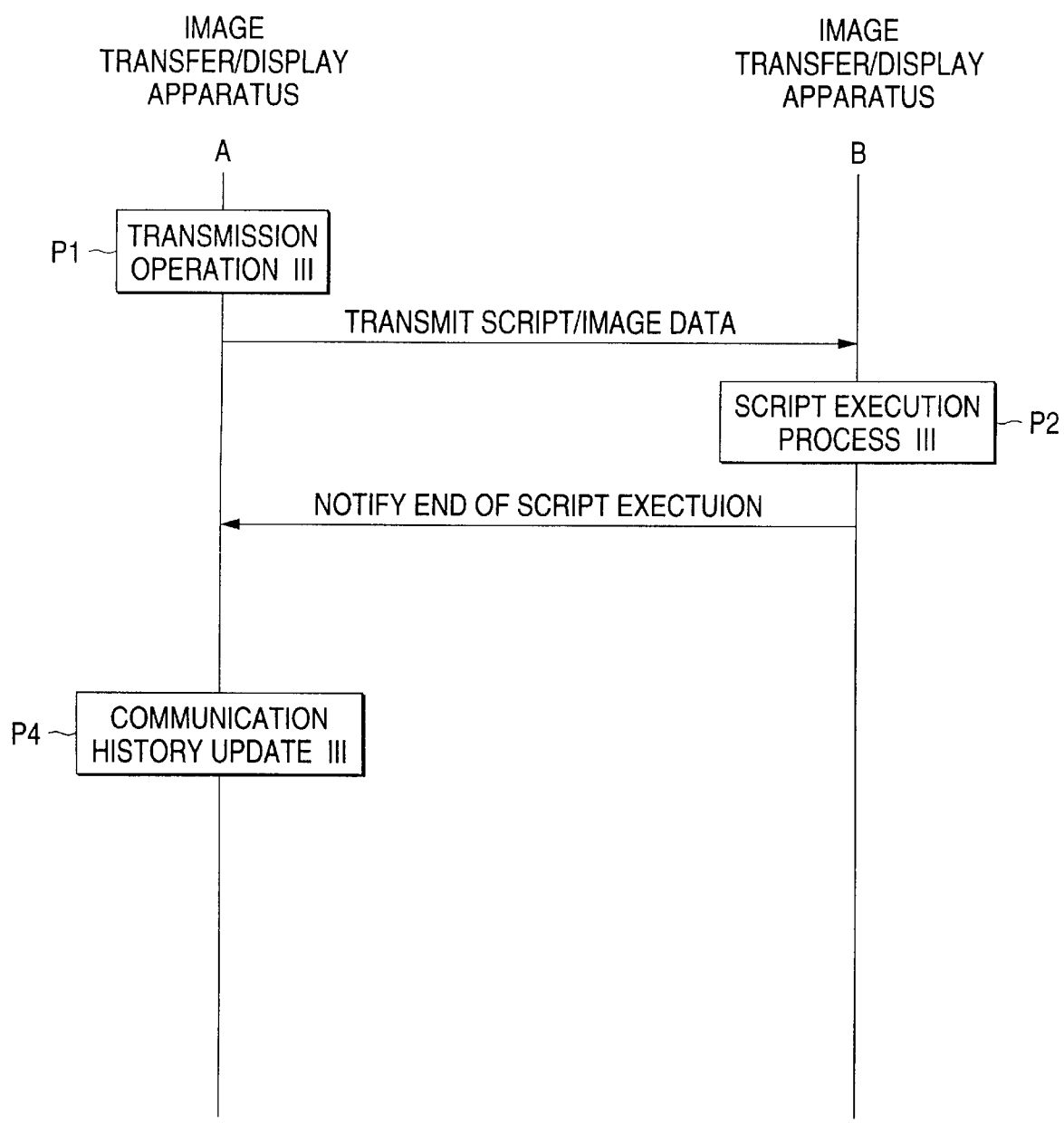
FIG. 9 shows a communication sequence according to an embodiment 3 of the present invention.

FIG. 9 represents an embodiment 3 of the present invention. Referring now to FIG. 9, a communication sequence of a communication system according to this embodiment 3 will be summarized. In this drawing, it is assumed that both image data and script are transmitted from an image transfer/display apparatus "A" functioning as a transmission source to another image transfer/display apparatus "B" functioning as a transmission destination so as to execute the script. For instance, when a user of the image transfer/display apparatus A of the transmission source executes a transmission operation IIIP1, this image transfer/display apparatus A of the transmission source transmits both image data and script to the image transfer/display apparatus B of the transmission destination. Next, upon receipt of the image data and the script, the image transfer/display apparatus B of the transmission destination executes a script execution process IIIP2, and transmits "notification of end of script execution" to the image transfer/display apparatus A of the transmission source. Next, upon receipt of "notification of end of script execution", the image transfer/display apparatus A of the transmission source executes a notification history update IIIP4.

Figure 10:
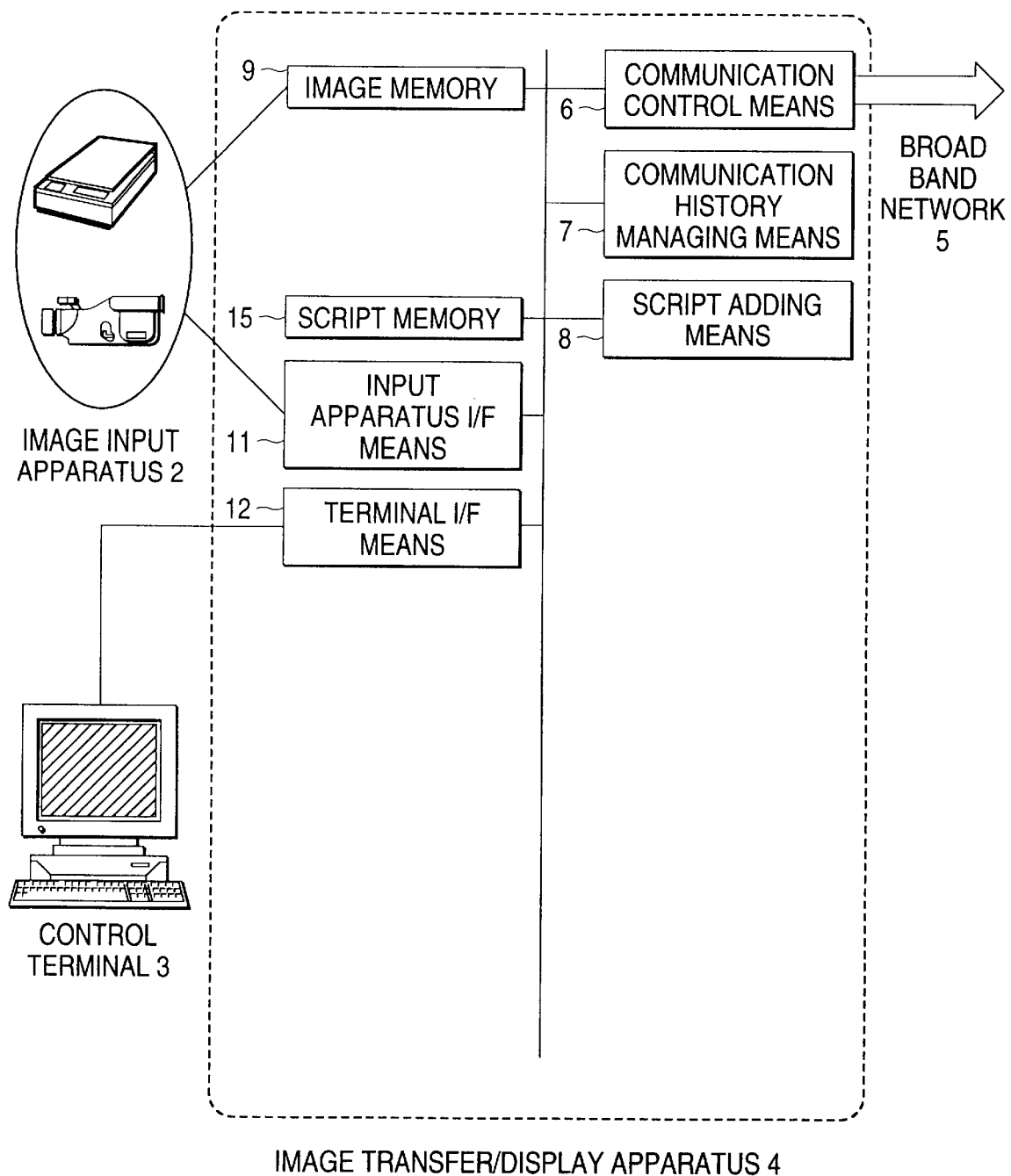
FIG. 10 represents an arrangement of an image transfer/display apparatus of a transmission source according to the embodiment 3.

A description will now be made of an arrangement of the image transfer/display apparatus A of the transmission source in the above-described communication system. FIG. 10 is a structural diagram of the image transfer/display apparatus A according to the embodiment 3 of the present invention. This image transfer/display apparatus A is such an image transfer/display apparatus constituted by adding a communication history managing means 7 for saving past communication records to the image transfer/display apparatus of the transmission source according to the embodiment 1 of FIG. 2.

Figure 11:
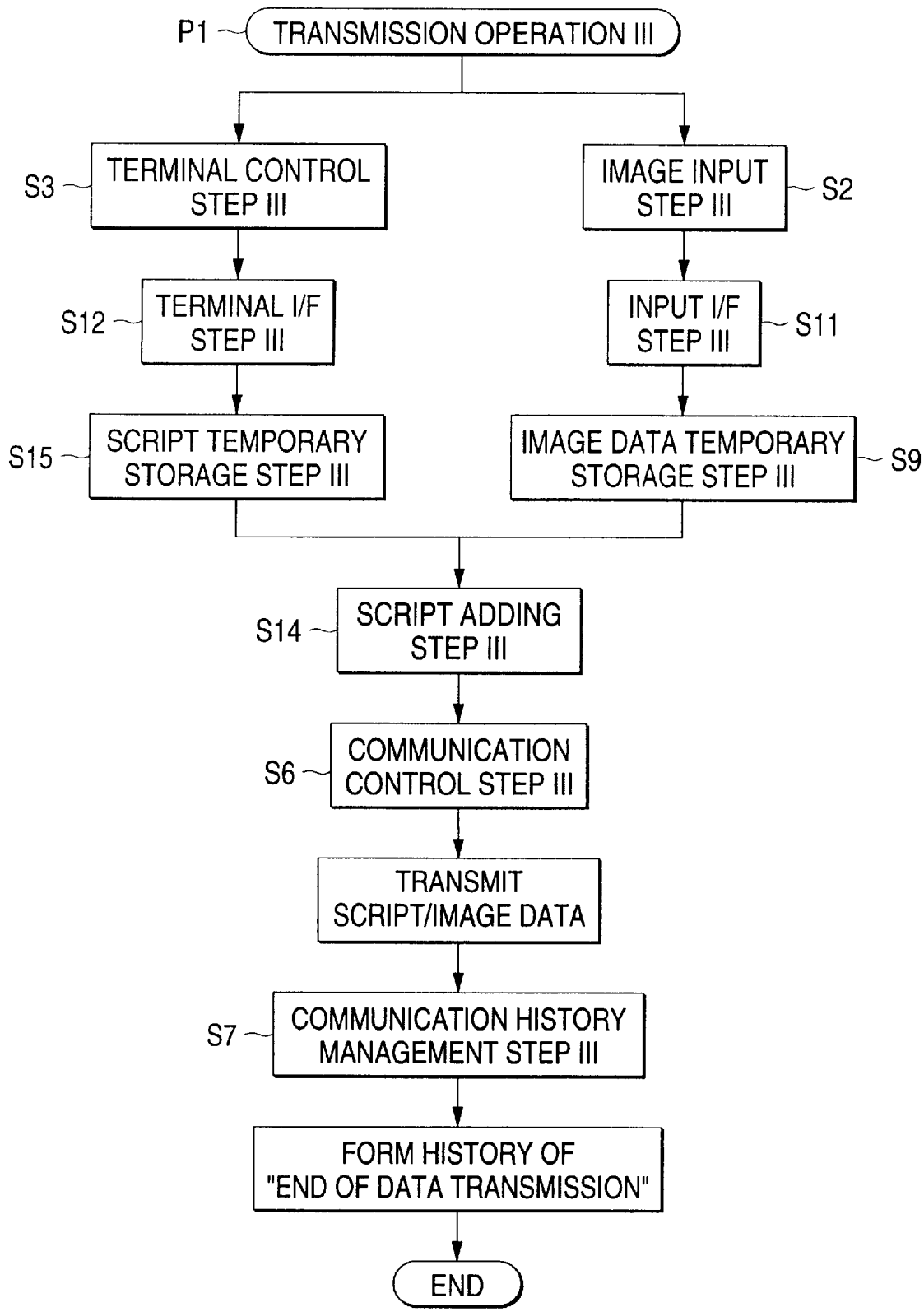
FIG. 11 is a flow chart for describing transmission operation according to the embodiment 3.

Next, as to operations of the image transfer/display apparatus A of the transmission source, the transmission operation IIIP1 shown in FIG. 9 will now be explained as an example. A user of this image transfer/display apparatus A temporarily stores the image data produced by the image input apparatus 2 via the input apparatus I/F means 11 into the image memory 9. The user of this apparatus temporarily stores the script formed by the control terminal 3 via the terminal I/F means 12 into the script memory 15. Then, the script temporarily stored in the script memory 15 is added to the image data temporarily stored in the image memory 9 by the script adding means 8. The image data added with the script is transmitted via the broad band network 5 to the image transfer/display apparatus B of the transmission source by the communication control means 6. The communication history managing means 7 forms a history of a communication as "end of data transmission". It should be noted that this process sequence is indicated in a flow chart of FIG. 11.

Figure 12:
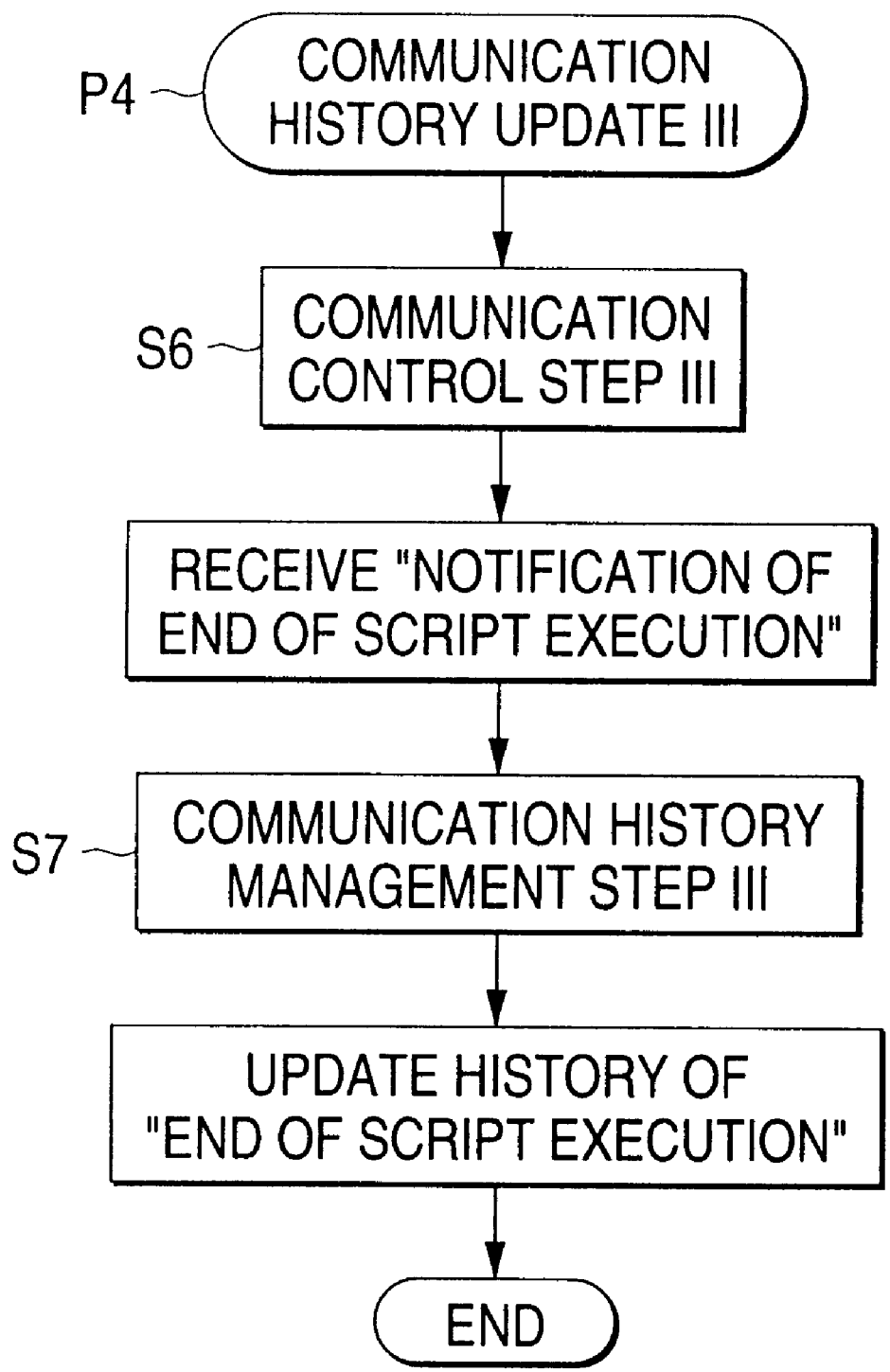
FIG. 12 is a flow chart for explaining a communication history update according to the embodiment 3.

Next, a description will now be made of operations of the communication history update IIIP4 of the image transfer/display apparatus A of the transmission destination. The communication control means 6 receives "notification of end of script execution" via the broad band network 5 from the image transfer/display apparatus B of the transmission source, and the communication history managing means 7 updates the communication history by "end of script execution". This process sequence is indicated in a flow chart of FIG. 12.

Since the above-described image transfer/display apparatuses are employed and also the means for displaying the communication history is separately provided, the user of the image transfer/display apparatus A of the transmission source can recognize that both the transmitted image data and the transmitted script are reached to the image transfer/display apparatus B of the transmission destination, and the display of the image data in accordance with the script is accomplished as to the past communication. As a consequence, it is possible to predict as to whether the reason why the image data is not reached is caused by the line failure occurred in the broad band network between the image transfer/display apparatus of the transmission destination and the image transfer/display apparatus of the transmission source, or caused by the malfunction of the apparatus.

(Embodiment 4)

Figure 13:
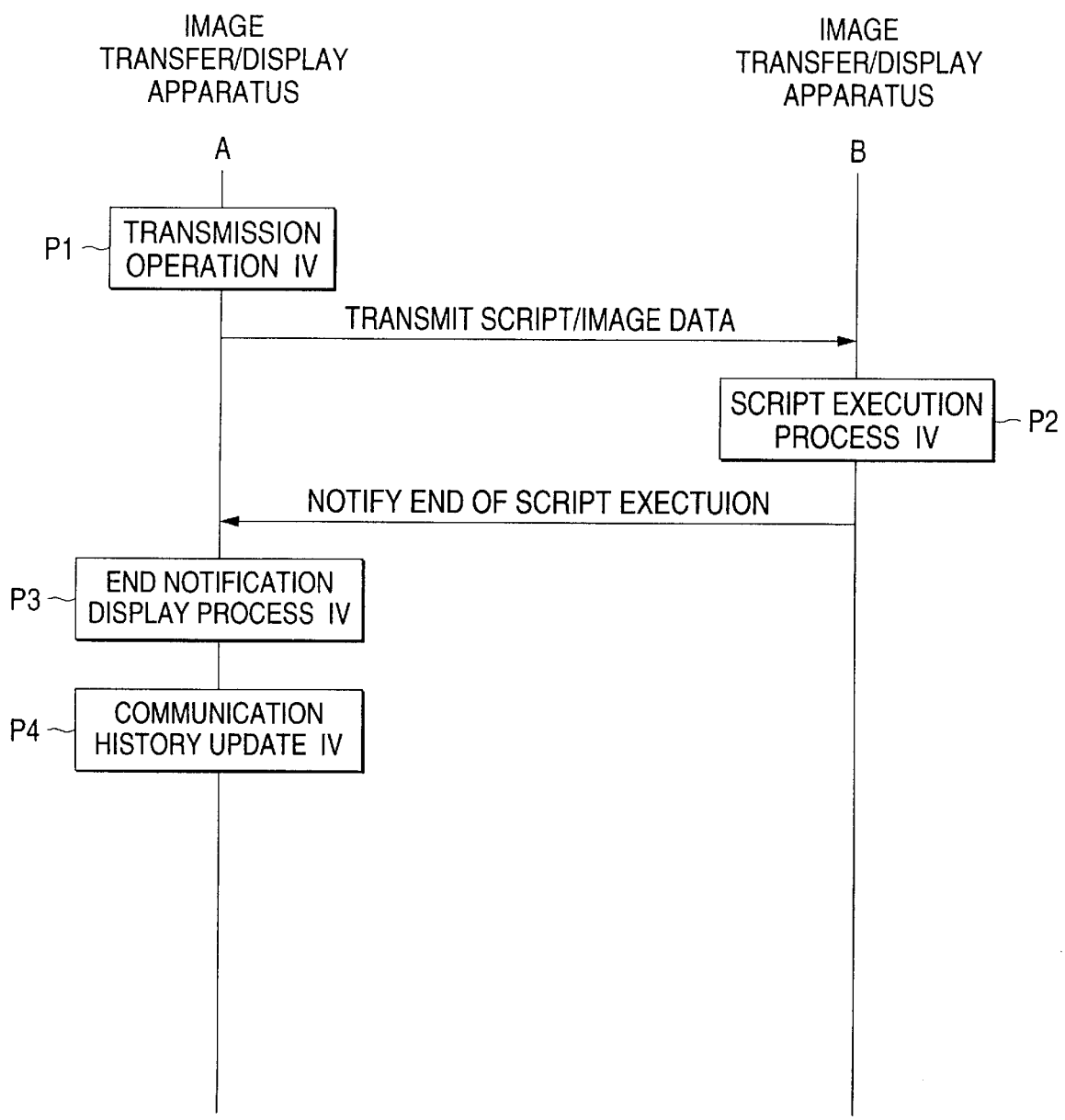
FIG. 13 shows a communication sequence according to an embodiment 4 of the present invention.

FIG. 13 represents an embodiment 4 of the present invention. Referring now to FIG. 13, a communication sequence of a communication system according to this embodiment 4 will be summarized. In this drawing, it is assumed that both image data and script are transmitted from an image transfer/display apparatus "A" functioning as a transmission source to another image transfer/display apparatus "B" functioning as a transmission destination so as to execute the script. For instance, when a user of the image transfer/display apparatus A of the transmission source executes a transmission operation IVP1, this image transfer/display apparatus A of the transmission source transmits both image data and script to the image transfer/display apparatus B of the transmission destination. Next, upon receipt of the image data and the script, the image transfer/display apparatus B of the transmission destination executes a script execution process IVP2, and transmits "notification of end of script execution" to the image transfer/display apparatus A of the transmission source. Next, upon receipt of "notification of end of script execution", the image transfer/display apparatus A of the transmission source executes a notification signal display process IVP3 and also a notification history update IVP4.

Figure 14:
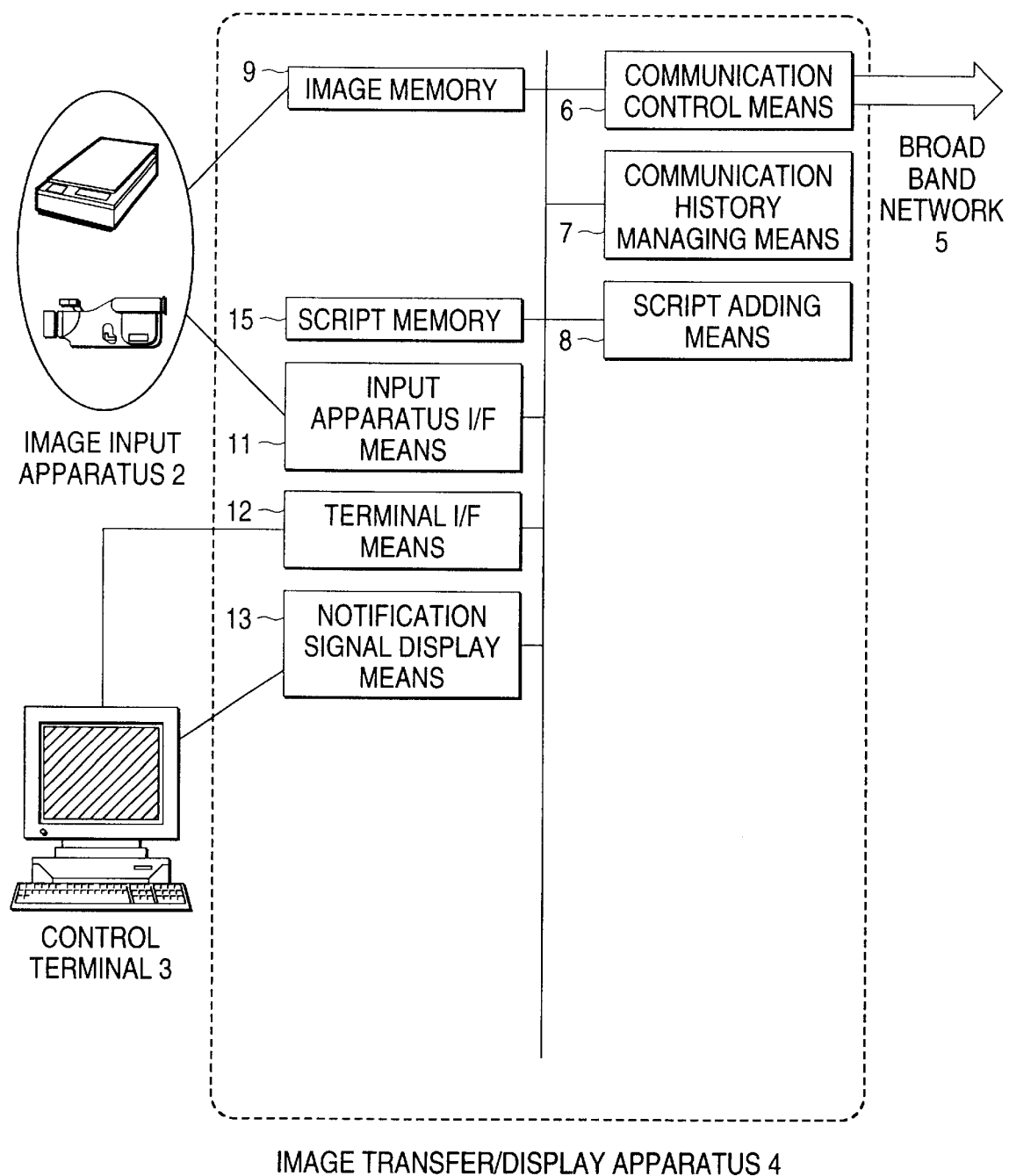
FIG. 14 represents an arrangement of an image transfer/display apparatus of a transmission source according to the embodiment 4.

A description will now be made of an arrangement of the image transfer/display apparatus A of the transmission source in the above-described communication system. FIG. 14 is a structural diagram of the image transfer/display apparatus A according to the embodiment 4 of the present invention. This image transfer/display apparatus A is such an image transfer/display apparatus constituted by adding a communication history managing means 7 for saving past communication records to the image transfer/display apparatus of the transmission source according to the embodiment 2 of FIG. 7.

As to operations of the image transfer/display apparatus A of the transmission source, both the transmission operation IVP1 and the communication history update IVP4 in FIG. 13 are identical to the transmission operation IIIP1 and the communication history update IIIP4 of the embodiment 3, and the end notification display process IVP3 is identical to the end notification display process IIP3 of the embodiment 2.

Since the above-described image transfer/display apparatuses are employed, the user of the image-transfer/display apparatus A of the transmission source can recognize that both the transmitted image data and the transmitted script are reached to the image transfer/display apparatus B of the transmission destination, and the display of the image data in accordance with the script is accomplished. Moreover, since the means for displaying the communication history is separately provided, the user also can recognize as to whether or not the display of the image data in accordance with the script of the image data is accomplished. As a consequence, in such a case that the image transfer/display apparatus B of the transmission source still executes the script, it is possible to prevent both the image data and the script from being transmitted. Also, it is possible to prevent both the image data and the script from being overwritten into the image memory and the script memory of the image transfer/display apparatus B of the transmission destination, respectively. Furthermore, it is possible to predict as to whether the reason why the image data is not reached is caused by the line failure occurred in the broad band network between the image transfer/display apparatus of the transmission destination and the image transfer/display apparatus of the transmission source, or caused by the malfunction of the apparatus.

(Embodiment 5)

Figure 15:
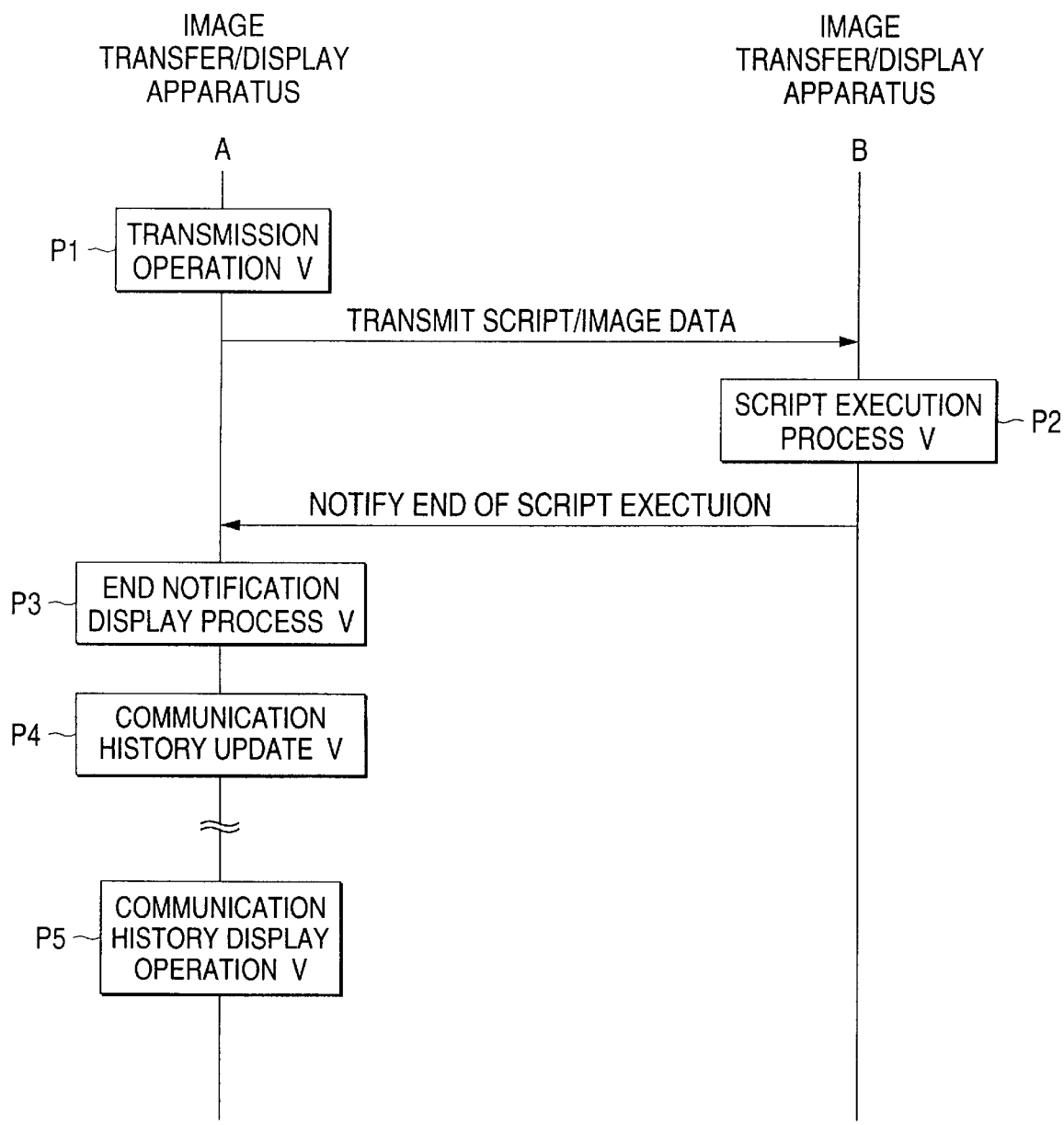
FIG. 15 shows a communication sequence according to an embodiment 5 of the present invention.

FIG. 15 represents an embodiment 5 of the present invention. Referring now to FIG. 15, a communication sequence of a communication system according to this embodiment 5 will be summarized. In this drawing, it is assumed that both image data and script are transmitted from an image transfer/display apparatus "A" functioning as a transmission source to another image transfer/display apparatus "B" functioning as a transmission destination so as to execute the script. For instance, when a user of the image transfer/display apparatus A of the transmission source executes a transmission operation VP1, this image transfer/display apparatus A of the transmission source transmits both image data and script to the image transfer/display apparatus B of the transmission destination. Next, upon receipt of the image data and the script, the image transfer/display apparatus B of the transmission destination executes a script execution process VP2, and transmits "notification of end of script execution" to the image transfer/display apparatus A of the transmission source. Next, upon receipt of "notification of end of script execution", the image transfer/display apparatus A of the transmission source executes a notification signal display process P3, and also a communication history update VP4. Thereafter, the user of the image transfer/display apparatus A of the transmission source executes a communication history display process VP5.

Figure 16:
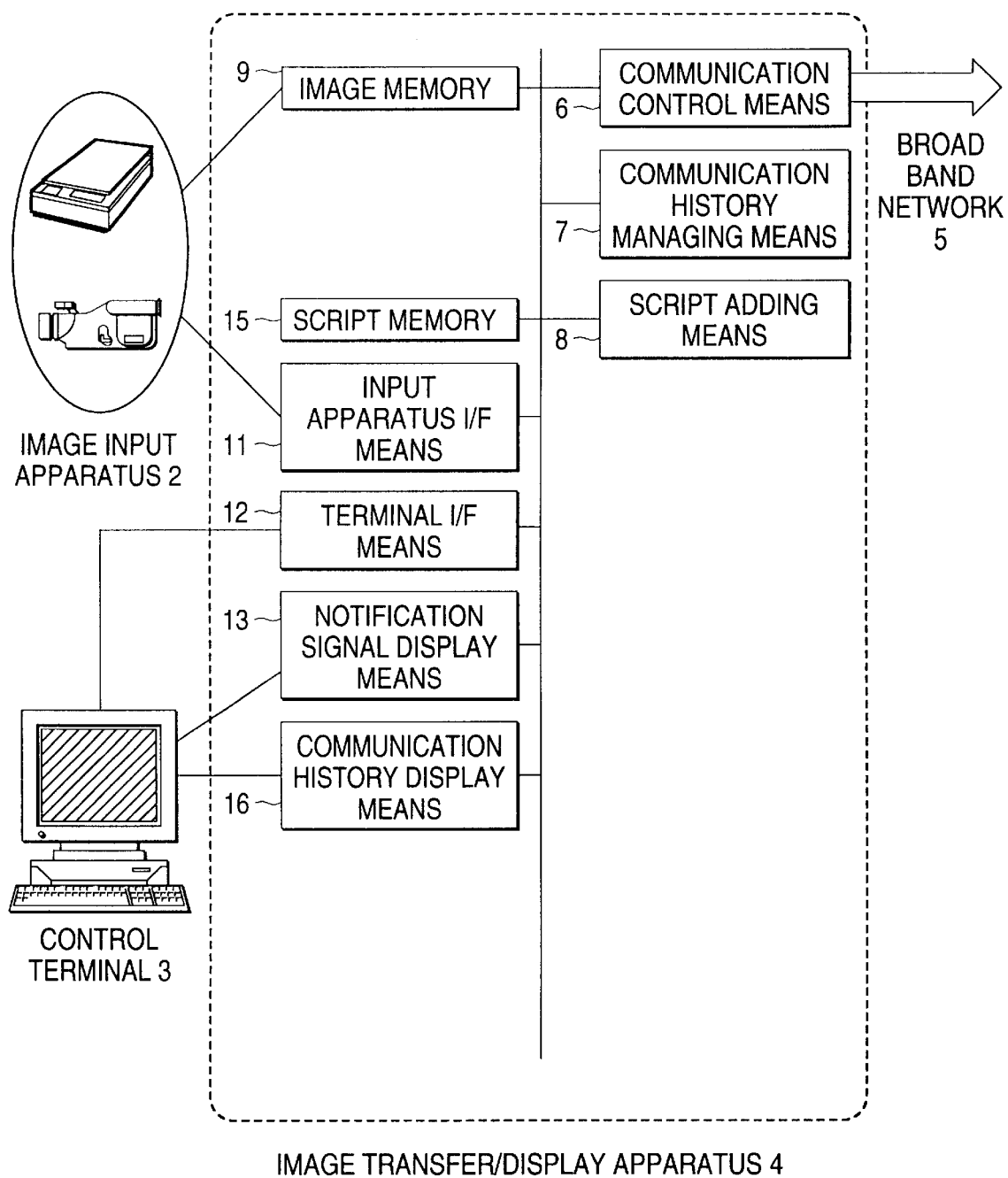
FIG. 16 represents an arrangement of an image transfer/display apparatus of a transmission source according to the embodiment 5.

A description will now be made of an arrangement of the image transfer/display apparatus A of the transmission source in the above-described image communication system. FIG. 16 is a structural diagram of the image transfer/display apparatus A according to the embodiment 5 of the present invention. This image transfer/display apparatus A is such an image transfer/display apparatus constituted by adding a communication history display means 16 for displaying a communication history on the control terminal 3 to the image transfer/display apparatus of the transmission source according to the embodiment 4 of FIG. 14.

Figure 17:
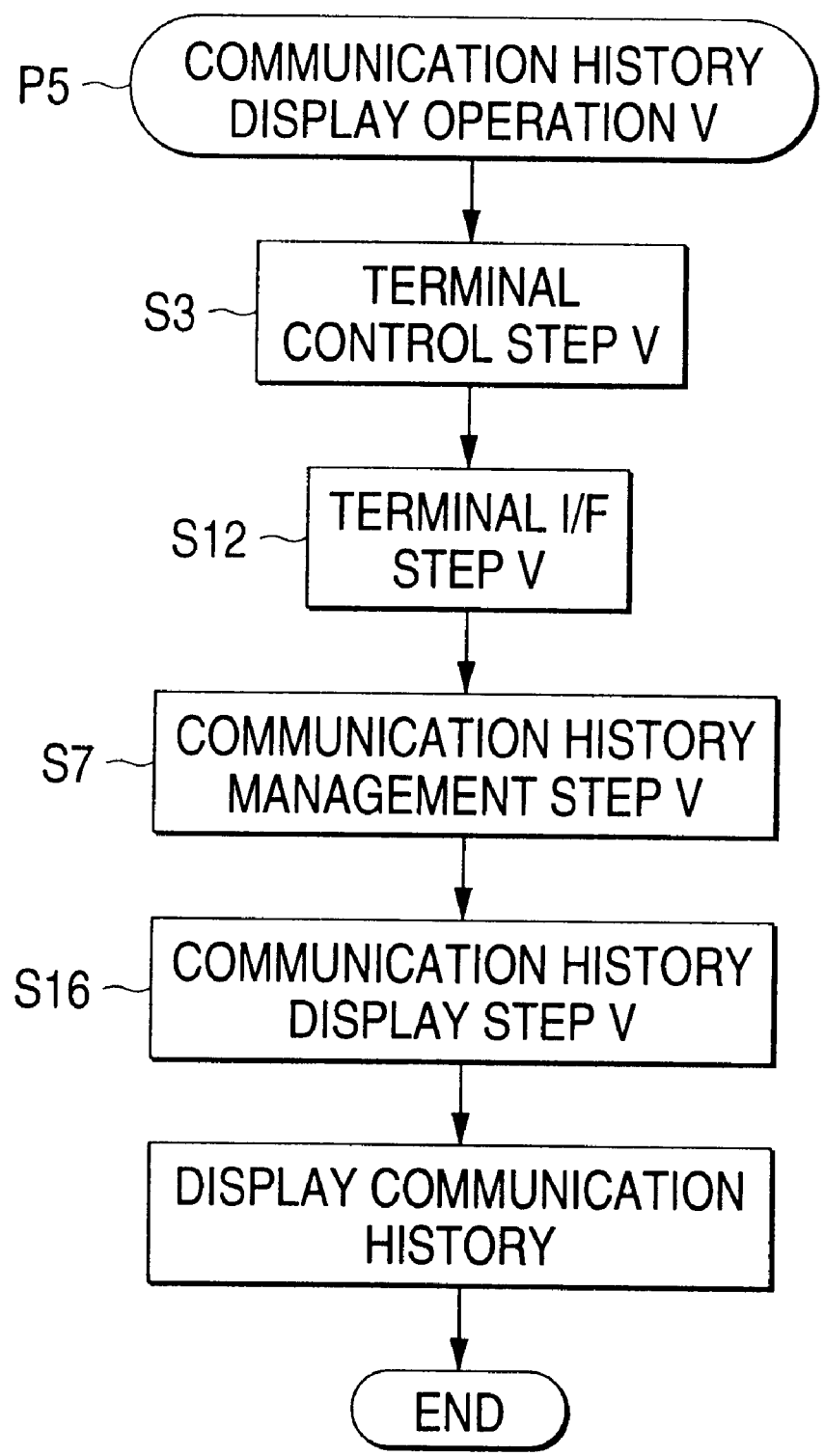
FIG. 17 is a flow chart for describing a communication history display operation according to the embodiment 5.

Next, as to operations of the image transfer/display apparatus A of the transmission source, a description will now be made of the communication history display process VP5 in FIG. 15. The user of this image transfer/display apparatus A operates the control terminal 3 to select the communication history from the terminal I/F means 12 from the communication history managing means 7. The communication history is displayed on the control terminal 3 by the communication history display means 16. It should be noted that this process sequence is indicated in a flow chart of FIG. 17.

Since the above-described image transfer/display apparatuses are employed, the user of the image transfer/display apparatus A of the transmission source can recognize that both the transmitted image data and the transmitted script are reached to the image transfer/display apparatus B of the transmission destination, and the display of the image data in accordance with the script is accomplished. Moreover, since the means for displaying the communication history is separately provided, the user also can recognize as to whether or not the display of the image data in accordance with the script of the image data is accomplished. As a consequence, in such a case that the image transfer/display apparatus B of the transmission source still executes the script, it is possible to prevent both the image data and the script from being transmitted. Also, it is possible to prevent both the image data and the script from being overwritten into the image memory and the script memory of the image transfer/display apparatus B of the transmission destination, respectively. Also, it is possible to predict as to whether the reason why the image data is not reached is caused by the line failure occurred in the broad band network between the image transfer/display apparatus of the transmission destination and the image transfer/display apparatus of the transmission source, or caused by the malfunction of the apparatus.

(Embodiment 6)

Figure 18:
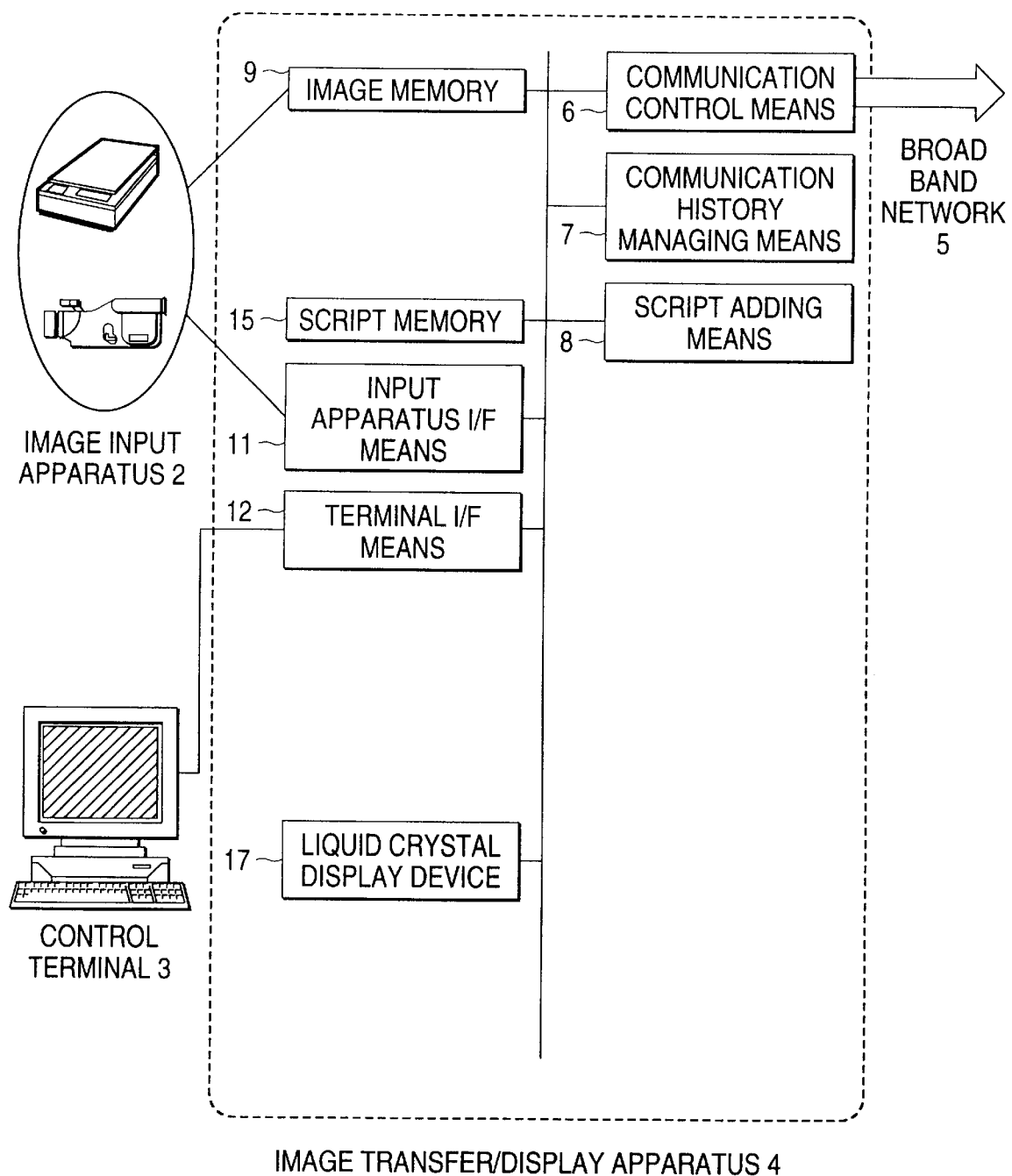
FIG. 18 represents an arrangement of an image transfer/display apparatus of a transmission source according to the embodiment 6.

An embodiment 6 of the present invention is similar to either the embodiment 2 or the embodiment 4. A description will now be made of an arrangement of an image transfer/display apparatus functioning as a transmission source in this image communication system. FIG. 18 is a structural diagram for representing an image transfer/display apparatus according to an embodiment 6 of the present invention. This image transfer/display apparatus 4 is such an image transfer/display constituted by adding a liquid crystal display device 17 instead of the notification signal display means 13 of the embodiment 4 in FIG. 14.

Figure 19:
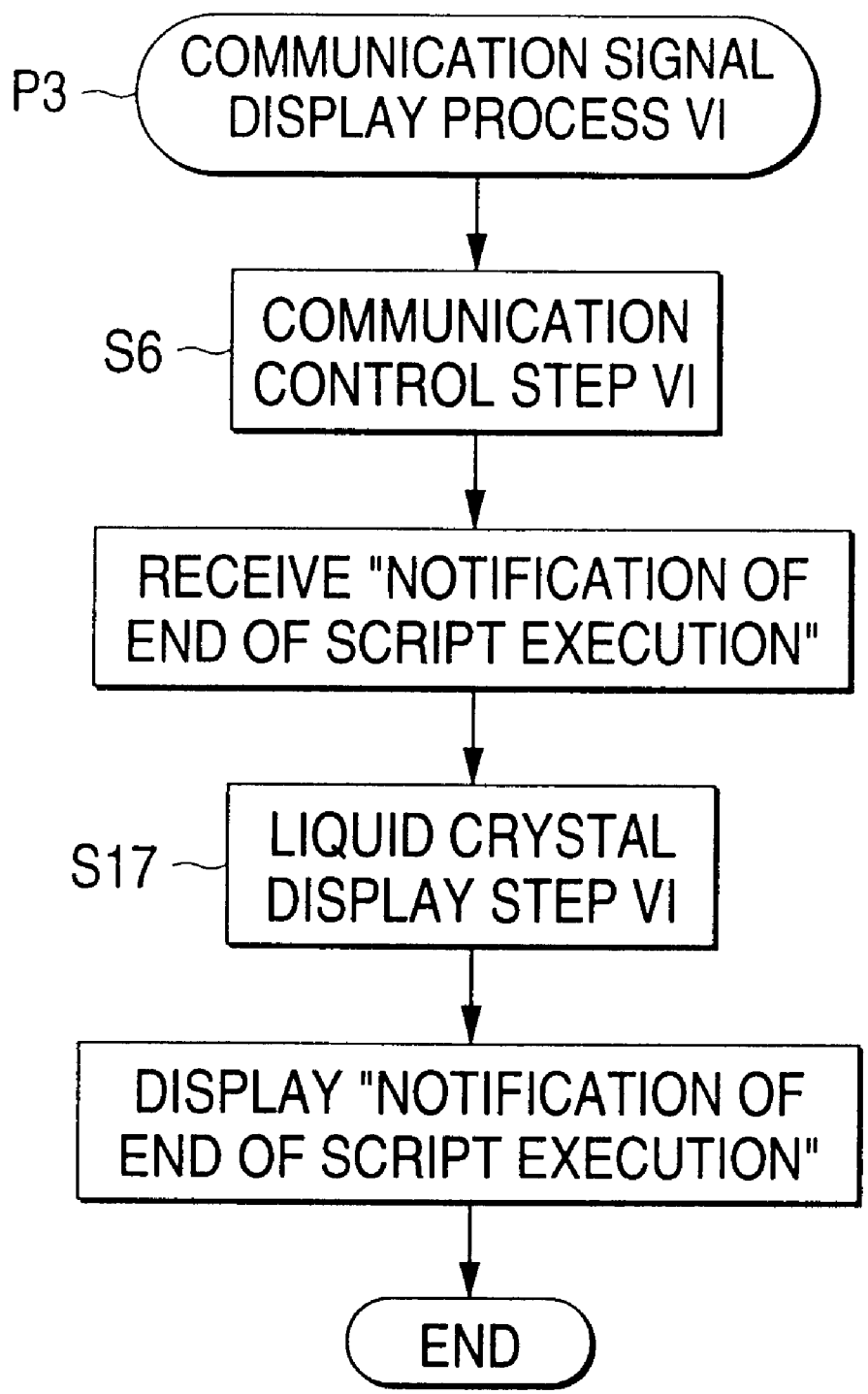
FIG. 19 is a flow chart for describing a notification signal display process operation according to the embodiment 6.

Next, operations of the image transfer/display apparatus A of the transmission source will now be explained as to a notification signal display process VIP3. The communication control means 6 receives "notification of end of script execution" via the broad band network 5 from the image transfer/display apparatus B of the transmission destination. When the above-described image transfer/display apparatus A of the transmission source receives "notification of end of script execution", the liquid crystal display device 17 displays "end of script execution". As a result, the user can visually confirm this display content. This process sequence is indicated in a flow chart of FIG. 19.

Since the above-described image transfer/display apparatuses are employed, the user of the image transfer/display apparatus A of the transmission source can recognize that both the transmitted image data and the transmitted script are reached to the image transfer/display apparatus B of the transmission destination, and the display of the image data in accordance with the script is accomplished, even when the control terminal is not used. As a consequence, in such a case that the image transfer/display apparatus B of the transmission destination still executes the script, it is possible to prevent both the image data and the script from being transmitted. Also, it is possible to prevent both the image data and the script from being overwritten into the image memory and the script memory of the image transfer/display apparatus B of the transmission source, respectively.

(Embodiment 7)

Figure 20:
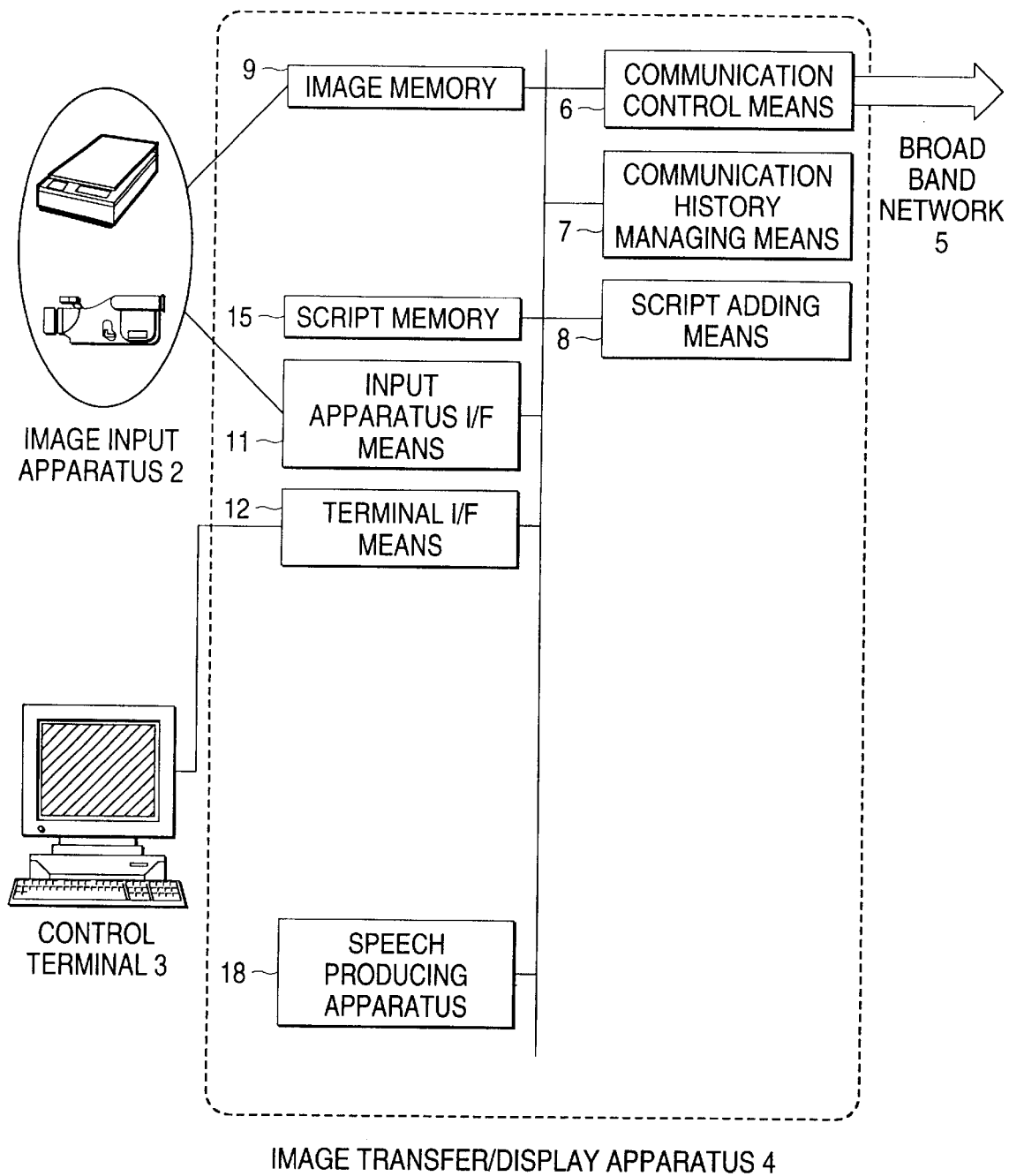
FIG. 20 shows an arrangement of an image transfer/display apparatus of a transmission source according to an embodiment 7 of the present invention.

An embodiment 7 of the present invention is similar to either the embodiment 2 or the embodiment 4. A description will now be made of an arrangement of an image transfer/display apparatus A functioning as a transmission source in this image communication system. FIG. 20 is a structural diagram for representing an image transfer/display apparatus according to an embodiment 7 of the present invention. This image transfer/display apparatus 4 is such an image transfer/display constituted by adding a speech producing apparatus 18 instead of the notification signal display means 13 of the embodiment 4 in FIG. 14.

Figure 21:
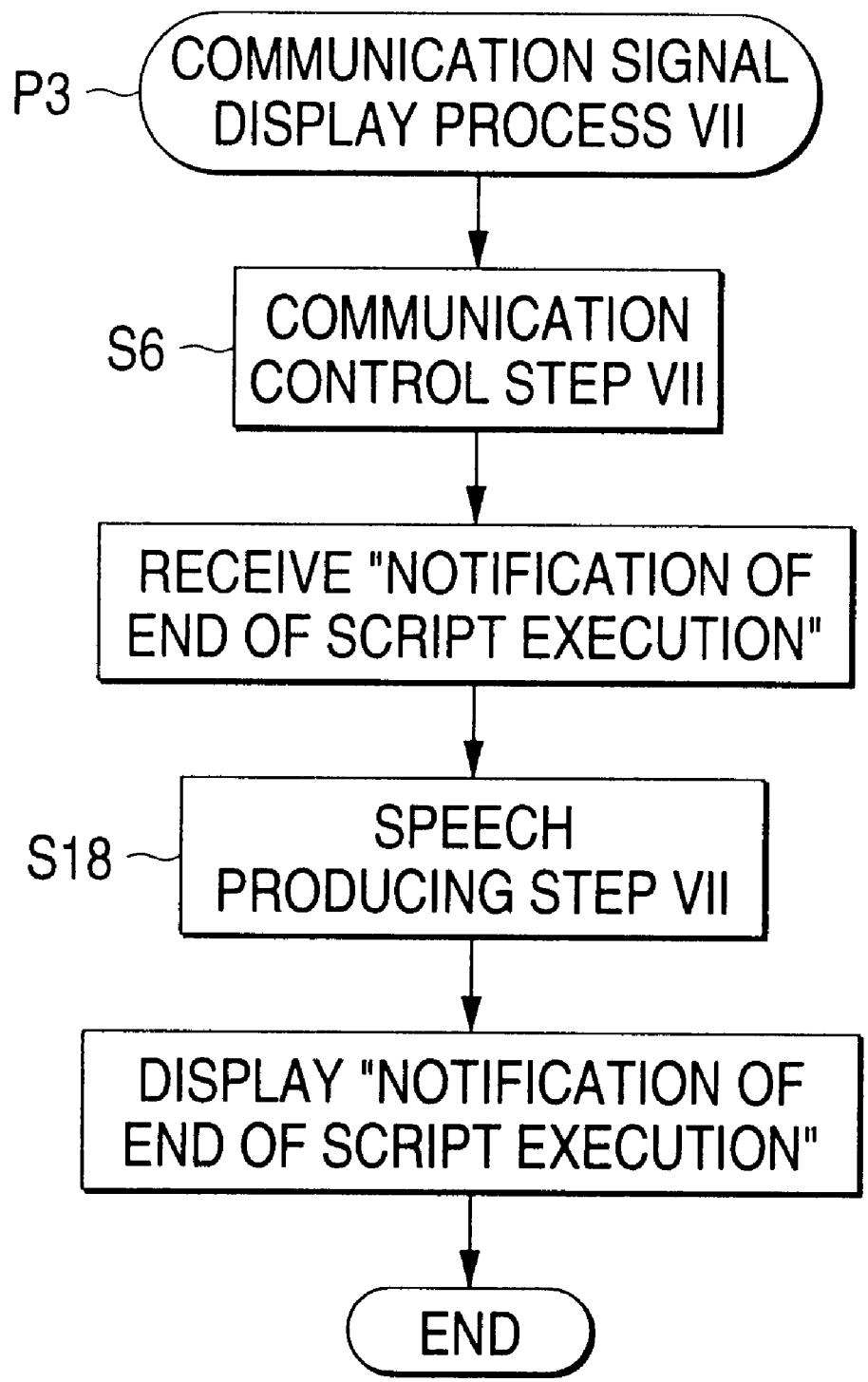
FIG. 21 is a flow chart for explaining a notification signal display process operation according to the embodiment 7.

Next, operations of the image transfer/display apparatus B of the transmission destination will now be explained as to a notification signal display process VIIP3. The communication control means 6 receives "notification of end of script execution" via the broad band network 5 from the image transfer/display apparatus B of the transmission destination. When the above-described image transfer/display apparatus 4 of the transmission source receives "notification of end of script execution", the speech producing apparatus 18 produces a speech having a meaning of "end of script execution". As a result, the user can confirm this end of the script execution by his ears. This process sequence is indicated in a flow chart of FIG. 21.

Since the above-described image transfer/display apparatuses are employed, the user of the image transfer/display apparatus A of the transmission source can recognize by his ears that both the transmitted image data and the transmitted script are reached to the image transfer/display apparatus B of the transmission destination, and the display of the image data in accordance with the script is accomplished without using the control terminal. As a consequence, in such a case that the image transfer/display apparatus B of the transmission source still executes the script, it is possible to prevent both the image data and the script from being transmitted. Also, it is possible to prevent both the image data and the script from being overwritten into the image memory and the script memory of the image transfer/display apparatus B of the transmission source, respectively.

(Embodiment 8)

Figure 22:
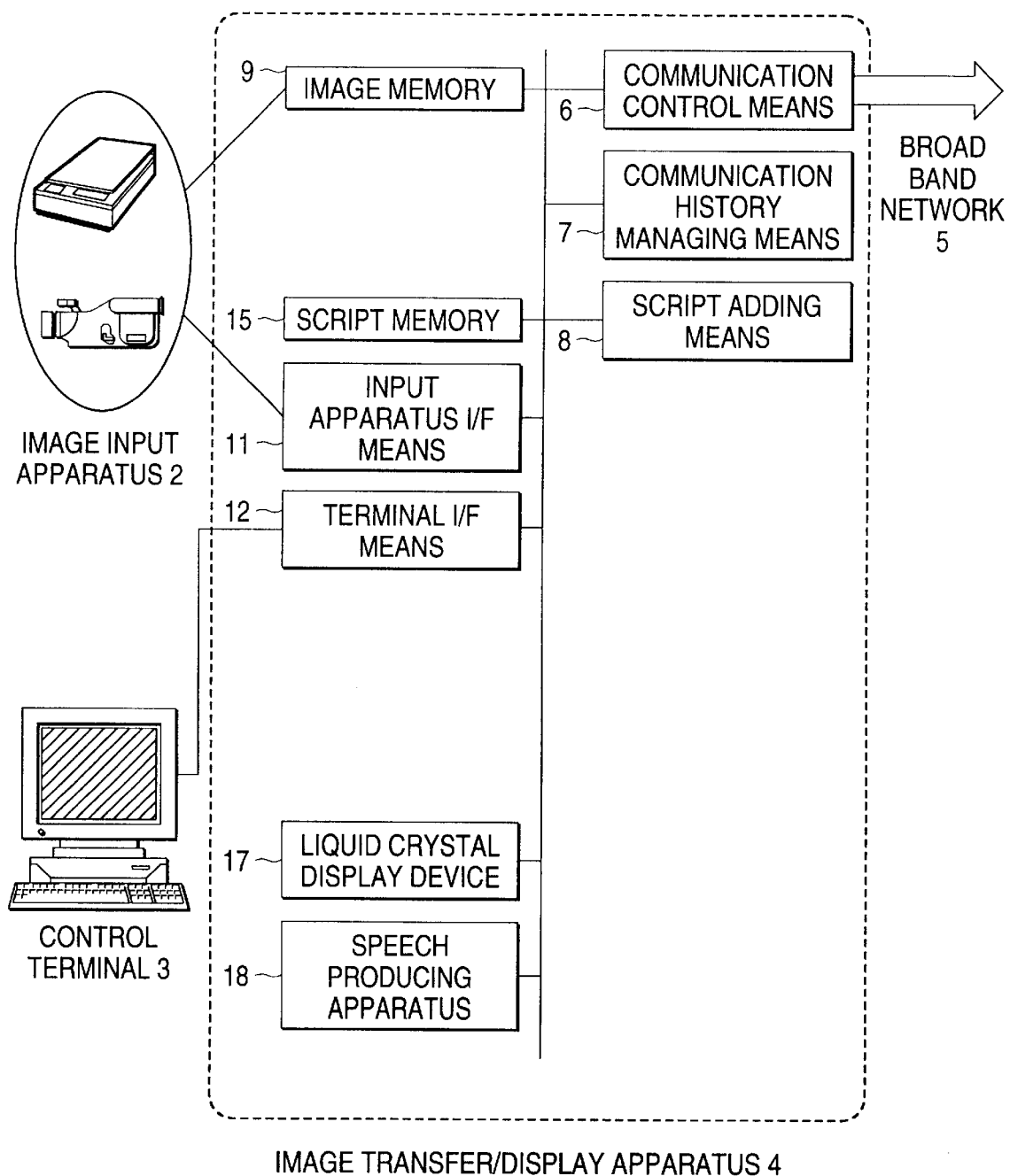
FIG. 22 shows an arrangement of an image transfer/display apparatus of a transmission source according to an embodiment 8 of the present invention.

An embodiment 8 of the present invention is similar to either the embodiment 2 or 4. A description will now be made of an arrangement of an image transfer/display apparatus A functioning as a transmission source in this image communication system. FIG. 22 is a structural diagram for representing an image transfer/display apparatus according to an embodiment 8 of the present invention. This image transfer/display apparatus 4 is such an image transfer/display constituted by adding thereto a liquid crystal display device 17 and a speech producing apparatus 18 instead of the notification signal display means 13 of the embodiment 4 in FIG. 14.

Figure 23:
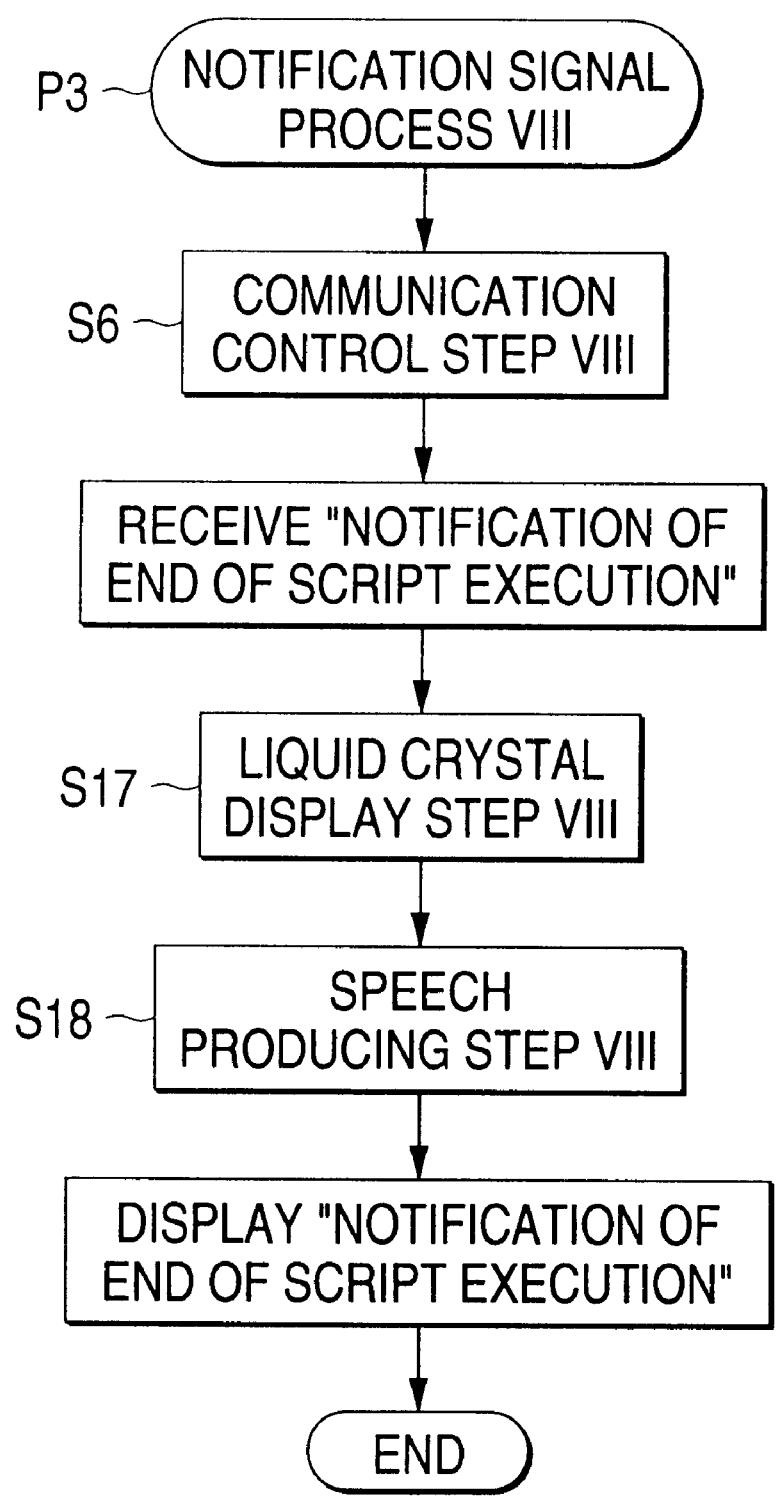
FIG. 23 is a flow chart for explaining a notification signal display process operation according to the embodiment 8.

Next, operations of the image transfer/display apparatus B of the transmission destination will now be explained as to a notification signal display process VIIP3. The communication control means 6 receives "notification of end of script execution" via the broad band network 5 from the image transfer/display apparatus B of the transmission destination. When the above-described image transfer/display apparatus A of the transmission source receives "notification of end of script execution", the liquid crystal display device 17 displays "end of script execution", and also the speech producing apparatus 18 produces such a speech having a meaning of "end of script execution". As a consequence, the user can confirm the end of the script execution by his eyes and ears. This process sequence is represented in a flow chart of FIG. 23.

Since the above-described image transfer/display apparatuses are employed, the user of the image transfer/display apparatus A of the transmission source can recognize by his eyes and ears that both the transmitted image data and the transmitted script are reached to the image transfer/display apparatus B of the transmission destination, and the display of the image data in accordance with the script is accomplished without using the control terminal. As a consequence, in such a case that the image transfer/display apparatus B of the transmission destination still executes the script, it is possible to prevent both the image data and the script from being transmitted. Also, it is possible to prevent both the image data and the script from being overwritten into the image memory and the script memory of the image transfer/display apparatus B of the transmission source, respectively.

(Embodiment 9)

Figure 24:
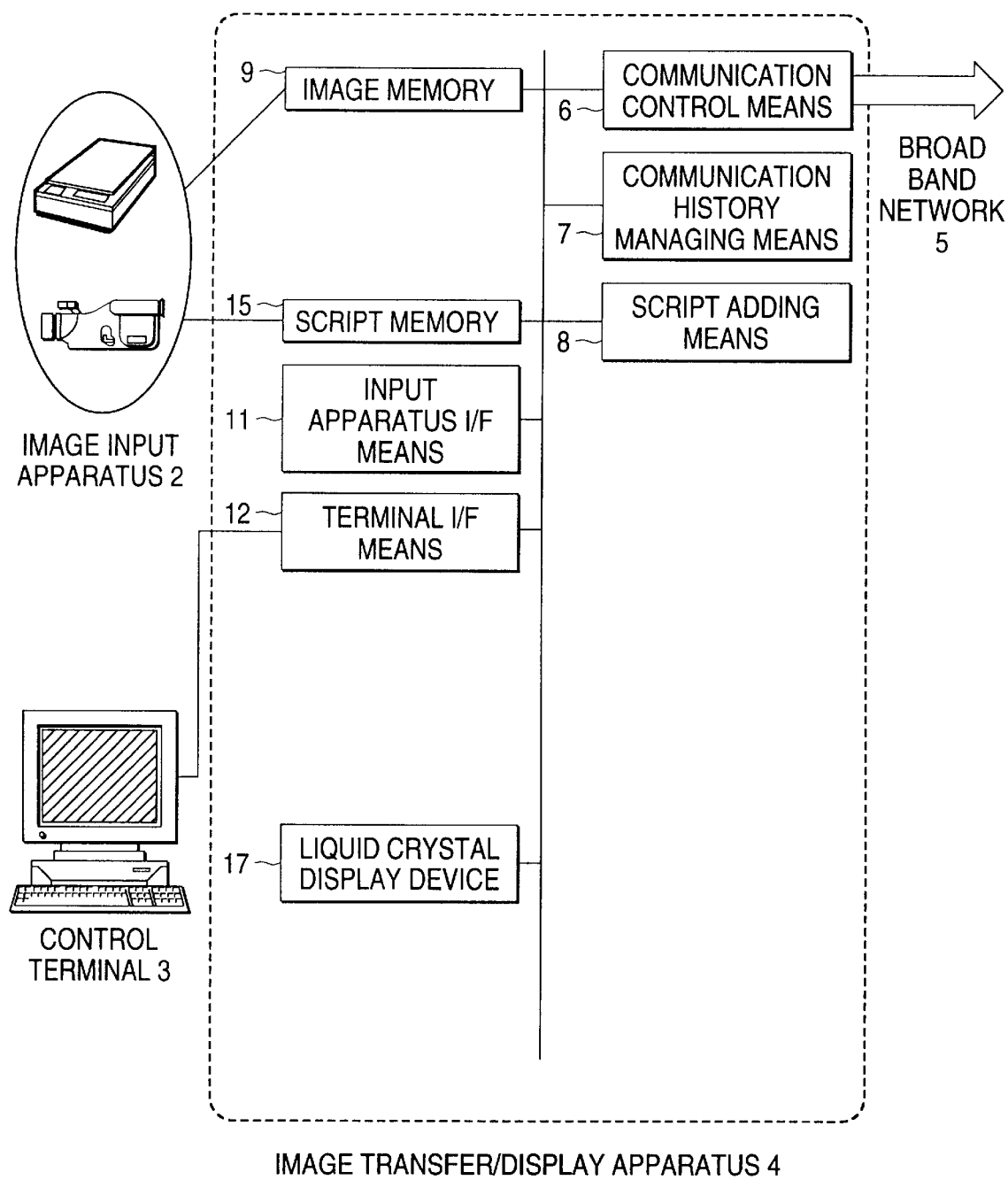
FIG. 24 shows an arrangement of an image transfer/display apparatus of a transmission source according to an embodiment 9 of the present invention.

An embodiment 9 of the present invention is similar to the embodiment 5. A description will now be made of an arrangement of an image transfer/display apparatus A functioning as a transmission source in this image communication system. FIG. 24 is a structural diagram for representing an image transfer/display apparatus according to an embodiment 9 of the present invention. This image transfer/display apparatus 4 is such an image transfer/display constituted by adding thereto a liquid crystal display device 17 instead of the communication history display means 16 of the embodiment 5 in FIG. 19.

Figure 25:
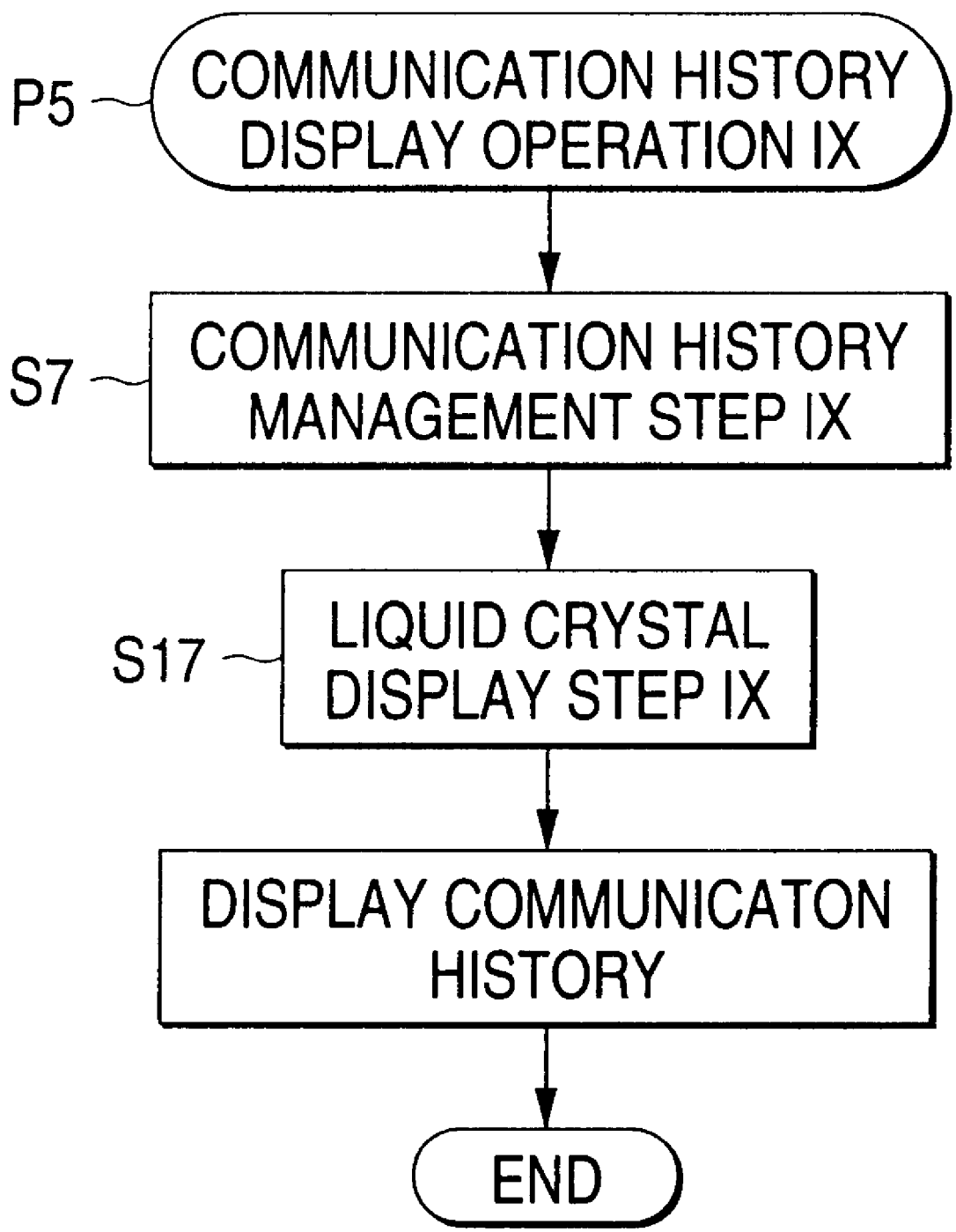
FIG. 25 is a flow chart for explaining a notification signal display process operation according to the embodiment 9.
Figure 26:
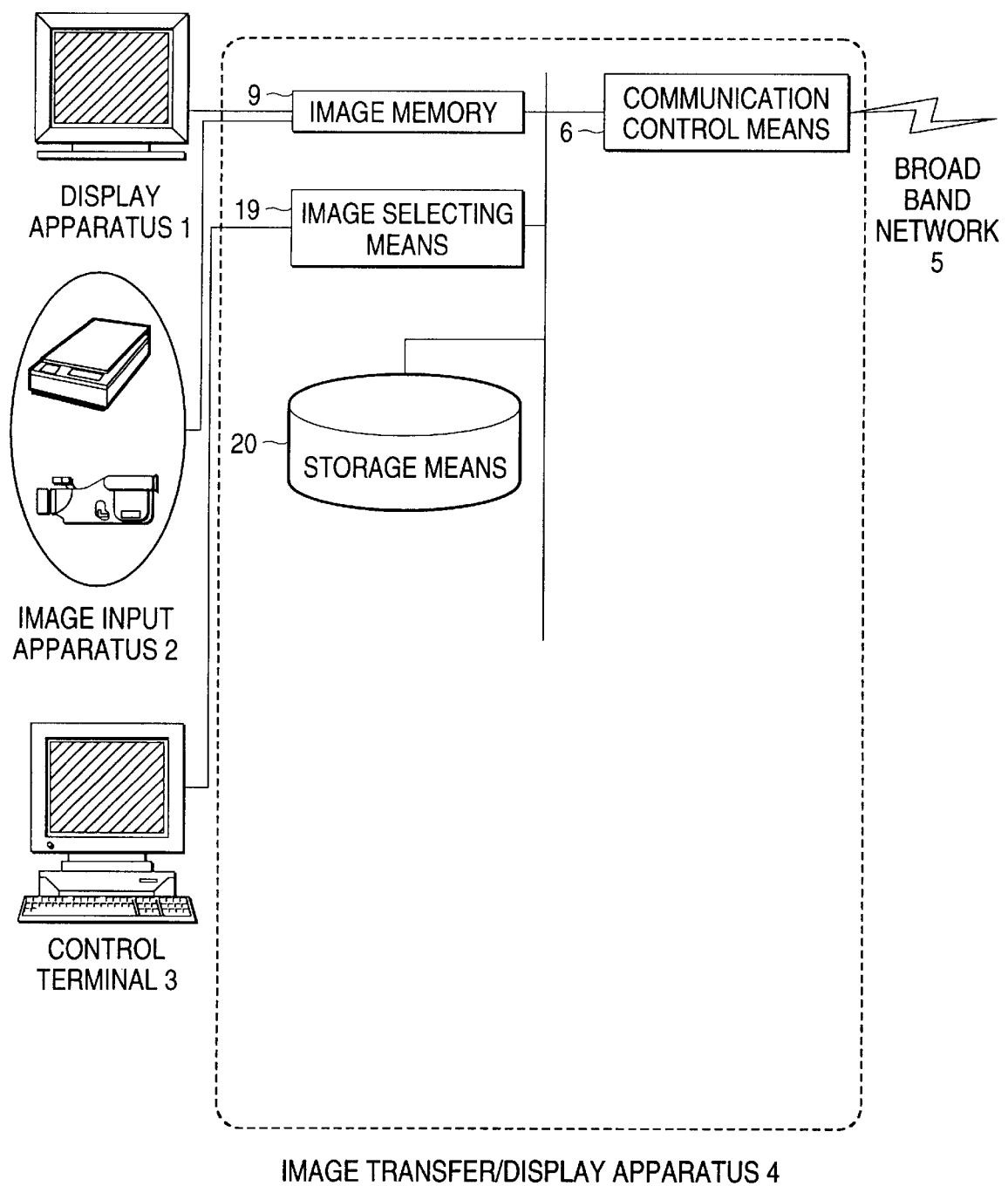
FIG. 26 indicates the arrangement of the conventional image transfer/display apparatus.

Next, operations of the image transfer/display apparatus A of the transmission source will now be explained as to a communication history display operation IXP5. The user of this image transfer/display apparatus A operates the control terminal 3 to select the communication history from the communication history managing means 7 via the terminal I/F means 12, and then displays the communication history on the liquid crystal display apparatus 17. It should be noted that this process sequence is indicated in a flow chart of FIG. 25.

Since the above-described image transfer/display apparatuses are employed, the user of the image transfer/display apparatus A of the transmission source can visually recognize that both the transmitted image data and the transmitted script are reached to the image transfer/display apparatus B of the transmission destination, and the display of the image data in accordance with the script is accomplished without using the control terminal. As a consequence, in such a case that the image transfer/display apparatus B of the transmission destination still executes the script, it is possible to prevent both the image data and the script from being transmitted. Also, it is possible to prevent both the image data and the script from being overwritten into the image memory and the script memory of the image transfer/display apparatus B of the transmission destination, respectively. Also, it is possible to predict as to whether the reason why the image data is not reached is caused by the line failure occurred in the broad band network between the image transfer/display apparatus of the transmission destination and the image transfer/display apparatus of the transmission source, or caused by the malfunction of the apparatus.

As previously described in detail, in accordance with the present invention, since the user of the transmitter unit can confirm as to whether or not the image data transmitted from the transmitter unit is surely transferred to the receiver unit and is firmly displayed, it is possible to achieve the firm image transfer operation.

What is claimed is:

1. An image communicating system comprising:
   a transmitter unit for digitally converting an input image signal and for outputting the converted image signal through a network; and
   a receiver unit for saving in a memory the image signal derived from the transmitter unit through the network and for displaying the image signal saved in the memory on a display;
   wherein said receiver unit transmits an end signal indicating that a display process has been completed to the transmitter unit through the network if the image signal saved in the memory is normally displayed on the display, and the display process for displaying the image signal on the display is completed.

2. An image communication system as claimed in claim 1 wherein said transmitter unit is comprised of display means for displaying the entry of the end signal upon input of the end signal supplied from the receiving unit.

3. An image communication system as claimed in claim 1 wherein said transmitter unit is comprised of communication history managing means for updating a communication history upon input of the end signal supplied from the receiver unit.

4. An image communication system as claimed in claim 3 wherein said transmitter unit comprises communication history display means for displaying the updated communication history.

5. An image communication system as claimed in claim 2 wherein said transmitter unit comprises a liquid crystal display device as the display means for displaying the entry of said end signal.

6. An image communication system as claimed in claim 2 wherein said transmitter unit comprises a speech producing apparatus for producing speech when the end signal supplied from said receiver unit is entered as the display means for displaying the entry of the end signal.

7. An image communication system as claimed in claim 2 wherein said transmitter unit comprises:
   a liquid crystal display device as the display means for displaying the entry of said end signal; and
   a speech producing apparatus for producing speech when the end signal supplied from the receiver unit is entered.

8. An image communication system as claimed in claim 4 wherein:
   said transmitter unit comprises:
   a liquid crystal display device as the communication history display means for displaying the updated communication history.

9. The image communicating system according to claim 1, wherein the transmitter unit transmits the image signal and reproduction control information of the image signal to the receiver unit through the network; and
   wherein the receiver unit saves in the memory the image signal and the reproduction control information from the transmitter unit through the network, and transmits an end signal indicating that the display process has been completed to the transmitter unit through the network if the image signal saved in the memory is normally displayed on the display according to the reproduction control information saved in the memory, and the display process for displaying the image signal on the display has been completed.

10. A method for communicating images comprising:

a transmitter unit for digitally converting an input image signal and for outputting the converted image signal through a network; and a receiver unit for saving in a memory the image signal derived from the transmitter unit through the network and for displaying the image signal saved in the memory on a display;

wherein said receiver unit transmits an end signal indicating that a display process has been completed to the transmitter unit through the network if the image signal saved in the memory is normally displayed on the display, and the display process for displaying the image signal on the display is completed.

11. An apparatus for transferring images in an image communication system the apparatus comprising at least a receiver capable of being coupled to a transmitter through the image communication system, the apparatus configured to;

digitally convert an input image signal;

enter a derived image signal derived from the converted input image signal;

display the derived image signal at the receiver;

output, an end signal from the receiver, the end signal indicating that the derived image signal has been displayed;

a receiver for saving in a memory through a network an image signal from a transmitter unit that digitally converts an input image signal and transmits the converted image signal and its reproduction control information through a network, and for displaying the image signal saved in the memory on a display; and wherein said receiver unit transmits an end signal indicating that a display process has been completed to the transmitter unit through the network if the image signal saved in the memory is normally displayed on the display, and the display process for displaying the image signal on the display completed.

12. An apparatus for transferring images in an image communication system the apparatus comprising at least a transmitter capable of being coupled to a receiver through the image communication system, the apparatus configured to;

digitally convert an input image signal;

enter a derived image signal derived from the converted input image signal;

receive at the transmitter an end signal, the end signal indicating that the derived image signal has been displayed;

a transmitter for digitally converting an input image signal and transmits the converted image signal through a network, and for displaying the image signal saved in a memory of a receiver unit on the display;

wherein said receiver unit receives though the network an end signal indicating that a display process has been completed which is transmitted from the receiver unit if the image signal saved in the memory by the receiver units is normally displayed on the display, and the display process for displaying the image signal on the display is completed.

* * * * *